United States Patent
Graham et al.

(10) Patent No.: US 10,528,518 B2
(45) Date of Patent: Jan. 7, 2020

(54) USING HARDWARE GATHER-SCATTER CAPABILITIES TO OPTIMIZE MPI ALL-TO-ALL

(71) Applicant: MELLANOX TECHNOLOGIES, LTD., Yokneam (IL)

(72) Inventors: Richard Graham, Knoxville, TN (US); Ana Gainaru, Knoxville, TN (US)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 20 days.

(21) Appl. No.: 15/681,390

(22) Filed: Aug. 20, 2017

(65) Prior Publication Data
US 2018/0052803 A1 Feb. 22, 2018

Related U.S. Application Data

(60) Provisional application No. 62/377,616, filed on Aug. 21, 2016.

(51) Int. Cl.
*G06F 15/173* (2006.01)
*H04L 12/931* (2013.01)
*G06F 13/12* (2006.01)

(52) U.S. Cl.
CPC ........ *G06F 15/17318* (2013.01); *G06F 13/12* (2013.01); *H04L 49/355* (2013.01)

(58) Field of Classification Search
CPC ...... G06F 13/12; G06F 9/54; G06F 15/17318; H04L 49/355
See application file for complete search history.

(56) References Cited

U.S. PATENT DOCUMENTS

| | | | |
|---|---|---|---|
| 8,255,475 B2 | 8/2012 | Kagan et al. | |
| 8,645,663 B2 | 2/2014 | Kagan et al. | |
| 9,456,060 B2* | 9/2016 | Pope | H04L 69/166 |
| 2009/0240838 A1* | 9/2009 | Berg | G06F 15/17337 709/252 |
| 2009/0327444 A1* | 12/2009 | Archer | G06F 15/17343 709/212 |
| 2010/0274876 A1 | 10/2010 | Kagan et al. | |
| 2010/0329275 A1* | 12/2010 | Johnsen | H04L 47/621 370/412 |
| 2013/0312011 A1* | 11/2013 | Kumar | G06F 9/546 719/314 |
| 2014/0040542 A1* | 2/2014 | Kim | G06F 12/0817 711/105 |

(Continued)

OTHER PUBLICATIONS

Bruck et al., "Efficient Algorithms for All-to-All Communications in Multiport Message-Passing Systems", IEEE Transactions on Parallel and Distributed Systems, vol. 8, No. 11, pp. 1143-1156, Nov. 1997.

(Continued)

*Primary Examiner* — Charles E Anya
(74) *Attorney, Agent, or Firm* — Kligler & Associates

(57) ABSTRACT

An all-to-all communication operation which is carried out in a fabric of networked entities by defining in each of the entities a plurality of memory regions of contiguous memory addresses holding messages therein, and exchanging the messages repeatedly with all the other entities. Relatively small messages are copied using a CPU and larger messages are transmitted using scatter/gather facilities.

16 Claims, 17 Drawing Sheets

(56) References Cited

U.S. PATENT DOCUMENTS

| | | |
|---|---|---|
| 2014/0136811 A1 | 5/2014 | Fleischer et al. |
| 2015/0074373 A1 | 3/2015 | Sperber et al. |
| 2015/0193271 A1* | 7/2015 | Archer .................. G06F 9/4843 718/101 |
| 2015/0261720 A1 | 9/2015 | Kagan et al. |
| 2015/0347012 A1* | 12/2015 | Dewitt .................... G06F 13/28 710/27 |
| 2016/0119244 A1* | 4/2016 | Wang .................. H04L 43/0876 709/226 |
| 2016/0283422 A1 | 9/2016 | Crupnicoff et al. |
| 2017/0192782 A1 | 7/2017 | Valentine et al. |
| 2017/0308329 A1 | 10/2017 | A et al. |

OTHER PUBLICATIONS

Gainaru et al., "Using InfiniBand Hardware Gather-Scatter Capabilities to Optimize MPI All-to-All", EuroMPI '16, Edinburgh, United Kingdom, 13 pages, year 2016.

MPI: A Message-Passing Interface Standard, Version 3.1, Message Passing Interface Forum, 868 pages, Jun. 4, 2015.

Shattah et al, U.S. Appl. No. 15/996,548, filed Jun. 4, 2018.

* cited by examiner

INITIAL BUFFER – INPUT DATA

| I0 | I1 | I3 | I7 | I15 | I11 | I5 | I13 | I5 | I2 | I6 | I14 | I10 | I4 | I12 | I18 |

STEP #    SEND/RECEIVE BUFFERS

0    | R1 | R2 | R3 | R4 | R5 | R6 | R7 | R8 |

1    | R0,1 | R9 | R0,2 | R10 | R0,3 | R11 | R0,4 | R12 |

2    | R1,2 | R1,3 | R0,5 | R13 | R1,4 | R1,5 | R0,6 | R14 |

3    | R2,4 | R2,5 | R2,6 | R2,7 | R1,6 | R1,7 | R0,7 | R15 |

SCATTER DATA LAYOUT
                                  154

HYBRID ALGORITHM METHODOLOGY (FOR A RADIX OF 2).

USING HARDWARE GATHER-SCATTER CAPABILITIES TO OPTIMIZE MPI ALL-TO-ALL

CROSS-REFERENCE TO RELATED APPLICATIONS

This Application claims the benefit of U.S. Provisional Application No. 62/377,616, filed 21 Aug. 2016, which is herein incorporated by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to electrical digital data processing. More particularly, this invention relates to protocols for transmission of digital data across a network

2. Description of the Related Art

The meanings of certain acronyms and abbreviations used herein are given in Table 1.

TABLE 1

| Acronyms and Abbreviations | |
| --- | --- |
| CPU | Central Processing Unit |
| HCA | Host Channel Adapter |
| HPC | High Performance Computing |
| IBA | InfiniBand Architecture |
| MPI | Message Passing Interface |
| NIC | Network Interface Card |
| NVMe | Non-Volatile Memory Express |
| PCIe | Peripheral Component Interconnect Express |
| PPN | Processes Per Node |
| RDMA | Remote Direct Memory Access |
| RoCE | RDMA over Converged Ethernet |
| SGE | Scatter/Gather Elements |
| SSD | Solid State Storage Device |
| WQE | Work Queue Elements |

Message Passing Interface (MPI) is a communication protocol that is widely used for exchange of messages among processes in high-performance computing (HPC) systems. The current MPI standard is published by the MPI Forum as the document MPI: A Message-Passing Interface Standard, Ver. 3.1; Jun. 4, 2015, which is available on the Internet and is herein incorporated by reference.

MPI supports collective communication in accordance with to a message-passing parallel programming model, in which data is moved from the address space of one process to that of another process through cooperative operations on each process in a process group. MPI provides point-to-point and collective operations that can be used by applications. These operations are associated with a defined object called a communicator. Communicators provide a mechanism to construct distinct communication spaces in which process groups can operate. Each process group is associated with a communicator and has a communicator identifier that is unique with respect to all processes inside the communicator.

Typically high performance computing (HPC) systems contains thousands of nodes, each having tens of cores. It is common in MPI to bind each process to a core. When launching an MPI job, the user specifies the number of processes to allocate for the job. These processes are distributed among the different nodes in the system. The MPI operations all-to-all and all-to-ally are some of the collective operations supported by MPI. These collective operations scatter and/or gather data from all members to all members of a process group. In the operation all-to-all, each process in the communicator sends a fixed-size message to each of the other processes. The operation all-to-ally is similar to the operation all-to-all, but the messages may differ in size.

Typically, MPI jobs allocate thousands of processes, spread between thousands of nodes. The number of nodes in an MPI job is denoted as N, and the number of processes in the MPI job as P, which leads to a total number of $N*P$ processes. Thus, in all-to-all (or all-to-allv) collectives between $N*P$ processes of the MPI job, each process sends $(N-1)*P$ messages to the other different processes. Therefore, each node outputs $(N-1)*P^2$ messages to the network, leading to a total number of $N*(N-1)*P^2$ messages in the fabric.

Assuming the value of N to be in the thousands and P in the tens, the number of messages in the fabric creates network congestion and incurs overhead in posting them to the network interface. The overhead becomes especially significant when the message payload is small, as each message requires both MPI and transport headers.

The MPI intra-communicator all-to-all collective operation is equivalent to performing a matrix transpose, where each MPI rank initially holds one column of the matrix. The length of data, 1, exchanged with each process is fixed. The actual amount of data transferred in the process of carrying out the all-to-all operation depends on the algorithm being used.

Two types of algorithms are in wide use and include direct exchange of data between all pairs of processes and aggregation algorithms. The direct exchange of data is most suitable when the size of the data exchanged is large enough to be bandwidth dominated, and puts the minimal amount of data on the network. In this case each MPI rank sends and receives $(N-1)*1$ bytes of data, where N is the communicator size. For large enough data blocks a big challenge with such algorithms is to minimize network congestion, thus achieve high network utilization.

Aggregation algorithms forward data from the source to the destination through intermediate processes, aggregating data destined to a particular process. These types of algorithms are well-suited for small data blocks of lengths 1, and are suitable when the data exchange is a latency-dominated operation. They exchange network bandwidth for latency in order to speed up overall algorithm completion time. A good example is the Bruck algorithm (J. Bruck, S. Member, et al., Efficient algorithms for all-to-all communications in multi-port message-passing systems. In *IEEE Transactions on Parallel and Distributed Systems*, pages 298-309, 1997) to minimize the number of messages sent, and minimize overall operation latency. For a radix k Bruck algorithm, there are $\lceil \log_k(N) \rceil$ steps, with data sent up to $k-1$ destinations, and received from up to $k-1$ sources at each step. When N is an integer power of k, the length of each message is $(1/k)*N$.

SUMMARY OF THE INVENTION

Disclosed embodiments of the invention provide two optimized variants of the Bruck algorithm, which differ in the way data is laid out in memory at intermediate steps of the algorithm. InfiniBand support for Host Channel Adapter (HCA) hardware scatter/gather is used to selectively transfer non-contiguous data, thereby replacing CPU-based buffer packing and unpacking. Transfer is accomplished using InfiniBand network hardware.

There is provided according to embodiments of the invention a method of data communication, which is carried out in a fabric of networked entities by linking each of the entities to all other entities, and executing an all-to-all communication operation among the entities. The communication operation is carried out in each of the entities by defining a plurality of memory regions of contiguous memory addresses holding messages therein, and exchanging the messages repeatedly with all the other entities.

In an additional aspect of the method exchanging the messages is performed with a transmitter by packing the messages of a first memory region into a data object, providing the data object to the transmitter, and with the transmitter accessing a second memory region using a scatter/gather facility, and transmitting the data object and the messages of the second memory region to the other entities.

According to one aspect of the method, the messages of the first memory region do not exceed a predefined size, and the messages of the second memory region exceed the predefined size.

A further aspect of the method is performed prior to a first performance of transmitting the data object and the messages by executing a shuffle algorithm to arrange an order of the messages of the first memory region and the messages of the second memory region.

Another aspect of the method includes executing a scatter algorithm to arrange an order of the messages of the memory regions.

According to yet another aspect of the method, exchanging the messages includes referencing the messages of the memory regions using respective memory keys.

According to still another aspect of the method, exchanging the messages is performed by concurrently transmitting the messages in an input buffer while populating new input buffers with new messages.

There is further provided according to embodiments of the invention a system of data communication, including a fabric of networked computing devices, wherein each of the computing devices are linked to all others of the computing devices. There are respective memories and network interfaces in the computing devices. The computing devices are configured for executing an all-to-all communication operation among the computing devices by in each of the computing devices defining a plurality of memory regions of contiguous memory addresses holding messages therein, and exchanging the messages repeatedly with other computing devices via the network interfaces.

BRIEF DESCRIPTION OF THE SEVERAL VIEWS OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

In the following description, numerous specific details are set forth in order to provide a thorough understanding of the various principles of the present invention. It will be apparent to one skilled in the art, however, that not all these details are necessarily always needed for practicing the present invention. In this instance, well-known circuits, control logic, and the details of computer program instructions for conventional algorithms and processes have not been shown in detail in order not to obscure the general concepts unnecessarily.

Documents incorporated by reference herein are to be considered an integral part of the application except that, to the extent that any terms are defined in these incorporated documents in a manner that conflicts with definitions made explicitly or implicitly in the present specification, only the definitions in the present specification should be considered.
System Architecture.

Figure 1:
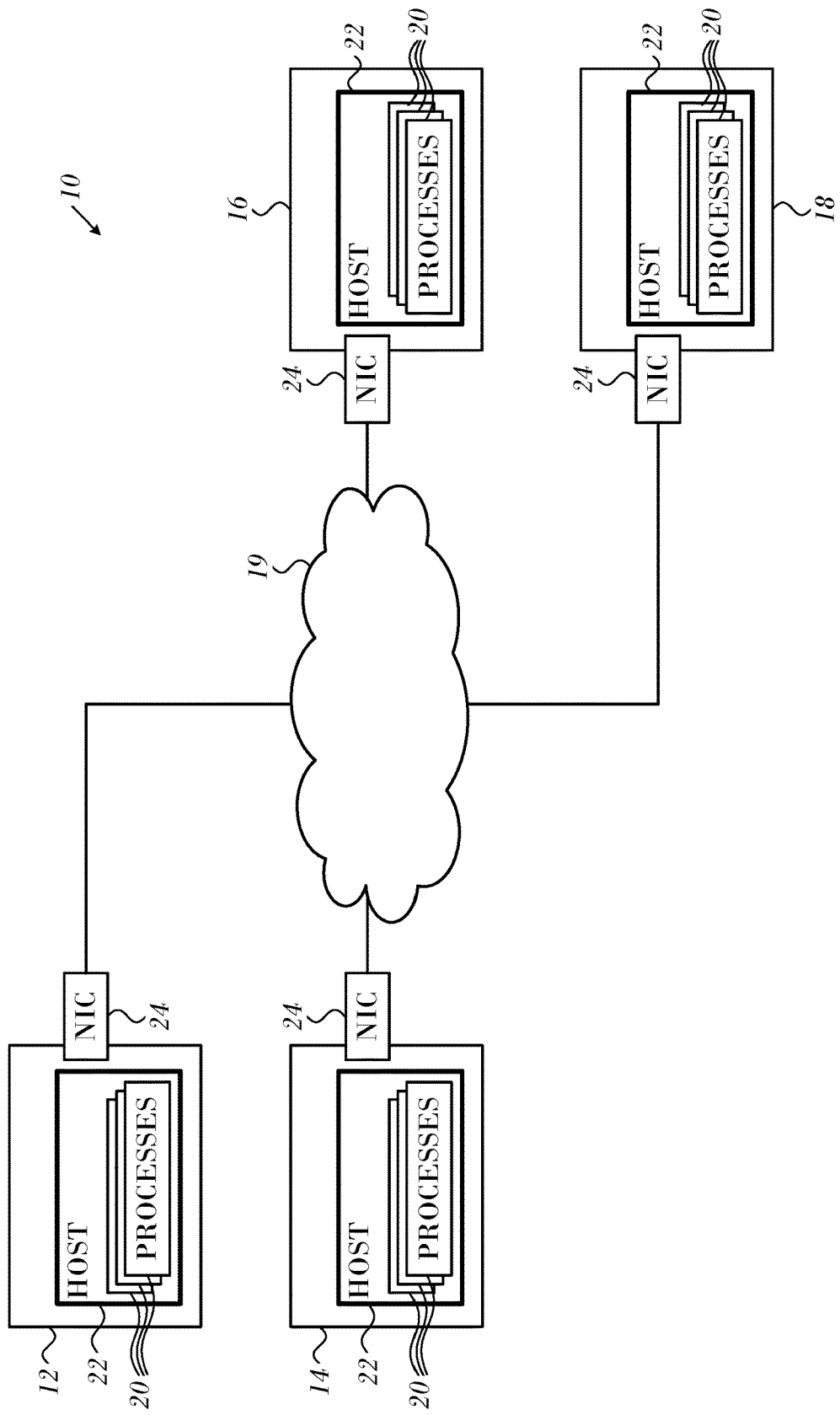
FIG. 1 is a block diagram of typical network elements, which transmit data in accordance with an embodiment of the invention.

Reference is now made to FIG. 1, which schematically illustrates an exemplary computer system 10 in which the principles of the invention are applied. The system 10 is configured for use in an InfiniBand fabric, but may be adapted for other networks by those skilled in the art. System 10 comprises nodes 10, 12, 14, 18, which are interconnected by a packet network 19, such as an InfiniBand switch fabric. The nodes each comprise processes 20, host 22, and NIC 24 linked to the network 19.

The system 10 exploits InfiniBand scatter/gather capabilities using inventive data layouts for intermediate data of aggregation algorithms in order to optimize performance of aggregation algorithms by eliminating the need for some data packing and unpacking as part of the transfer of data that is noncontiguous in main memory.

Figure 2:
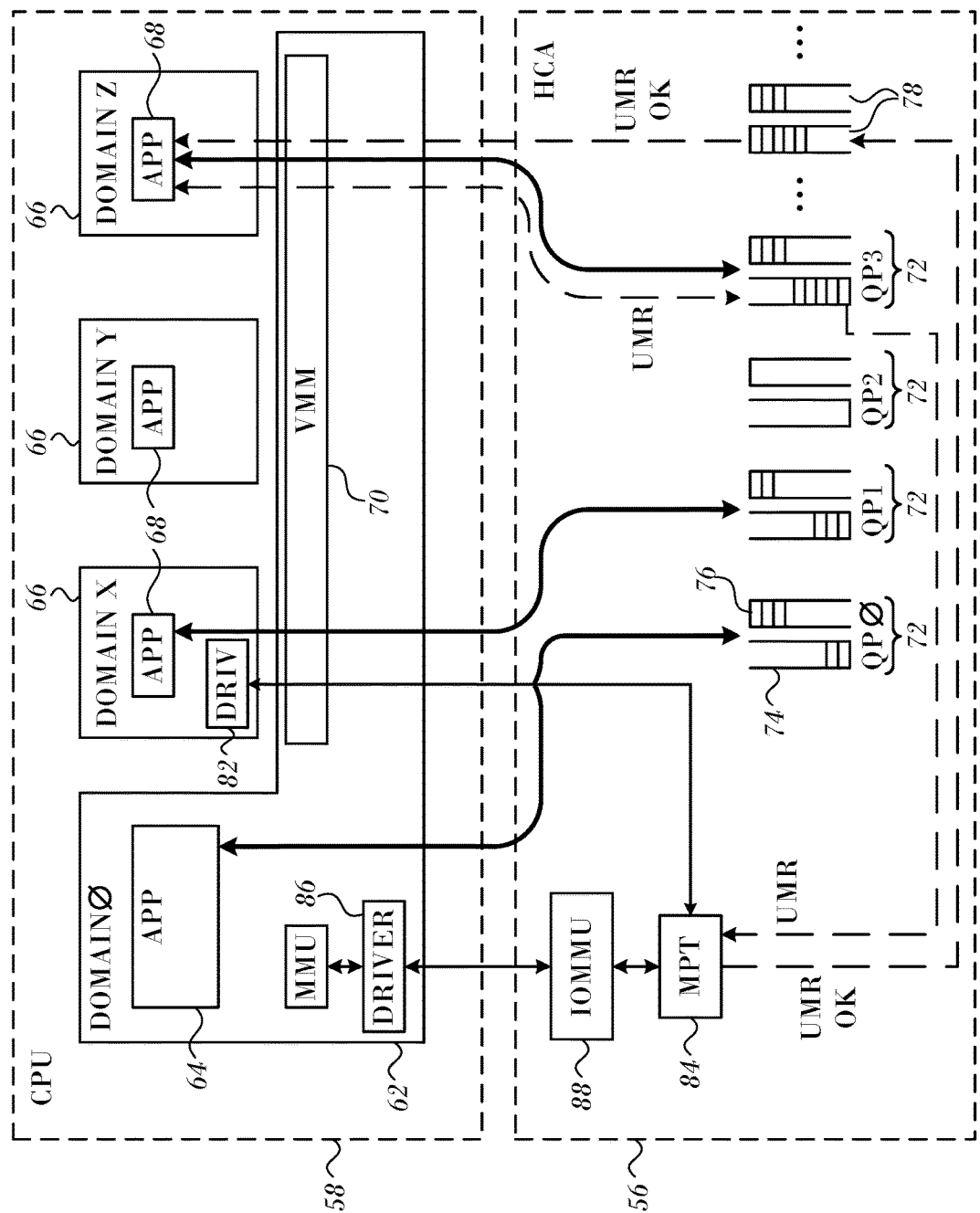
FIG. 2 is a block diagram that schematically shows functional details of interaction between host computer software and a HCA, in accordance with an embodiment of the present invention.

FIG. 2 is a block diagram that schematically shows functional details of interaction between HCA 56 and software running on CPU 58, in accordance with an embodiment of the present invention. In this embodiment, system 10 is assumed to support a virtual machine environment, in which HCA 56 performs a multi-stage address translation process, as described hereinbelow.

The address translation mechanisms implemented in HCA 56, however, including user-mode memory registration and address translation indirection, are likewise applicable to computers running any suitable sort of host operating system, with or without virtual machine support, as will be apparent to those skilled in the art.

CPU 58 operates a host domain 62 (referred to in the figure as DOMAIN 0), with a host operating system (not shown), which supports host applications 64. In addition, the CPU may concurrently run one or more virtual machines 66 (labeled DOMAIN X, DOMAIN Y, DOMAIN Z, . . . ), each with its own guest operating system and guest applications 68. A virtual machine monitor (VMM) 70 in the host domain (also referred to as a "hypervisor") interacts with the kernels of the guest operating systems in a manner that emulates the host processor and allows the virtual machines to share the resources of the CPU.

A wide range of virtual machine software of this sort is available commercially, and further description is beyond the scope of the present invention.

For efficient use of HCA resources, both host domain 62 and virtual machines 66 are able to interact directly with HCA 56, rather than passing commands and data through the host domain. Thus, as shown in FIG. 2, each application 64, 68 may be assigned one or more queue pairs 72 (labeled QP0, QP1, . . . , in the figure), comprising a send queue 74 and a receive queue 76, as explained above. The applications also receive CQEs from HCA 56 via their assigned completion queues 78. Furthermore, each virtual machine 66 may post control and configuration commands to the HCA via a respective command queue (not shown). In other words, the HCA appears to each virtual machine to be a dedicated I/O device for use by that virtual machine. This configuration minimizes the burden on VMM 70 and on the host operating system.

Using the respective queue pairs 72, each virtual machine 66 is able to execute data flow operations directly between HCA 56 and memory. For this purpose, a HCA driver 82, which is associated with the guest operating system in each virtual machine 66 (although only one such driver is shown for simplicity), initially registers memory protection keys and virtual address spaces for use by respective QPs. This initial registration is a privileged operation, which is carried out via the operating system kernel. (Subsequently, applications 64, 68 may perform non-privileged, user-mode memory registration operations, as described below.) HCA driver 82 loads the keys and address translation tables into a memory protection and translation (MPT) unit 84, for use by the HCA in servicing work items in the QP. An HCA driver 86 in host domain 62 loads keys and address translation tables for use by host applications 64.

The address translation tables loaded into MPT unit 84 by the HCA drivers convert virtual addresses into physical addresses. In the case of HCA driver 86 of the host domain, the physical addresses are actual machine addresses in memory. For virtual machines 66, however, these "physical addresses" are actually just another level of virtual addresses, defined in the virtual address space that is allocated to each virtual machine. The "physical addresses" in the virtual machine address spaces are translated by an I/O memory management unit (IOMMU) 88 into actual machine addresses in memory, which are used in writing to and reading from the memory. HCA Driver 86 loads the required address translation tables into IOMMU 88, based on the virtual memory spaces that have been allocated to each of the virtual machines.

For the sake of conceptual clarity, MPT unit 84 and IOMMU 88 are shown in FIG. 2 as separate entities. In practice, however, these two entities may be combined into a unified set of translation and protection tables, as illustrated below in FIG. 3. Alternatively, the functions of the IOMMU may be carried out by a separate unit, which may be located outside HCA 56 on a bus (not shown) or as a part of CPU 58. The configuration shown in FIGS. 2 and 3, however, is advantageous in conserving system resources and enhancing the flexibility of the HCA.

The virtual memory space that is allocated to virtual machines 66 and to applications 64, 68 may exceed the actual amount of space available in memory. This sort of oversubscription may occur both in the allocation of memory to the virtual machines and in the allocation of this "virtual physical" memory among guest applications 68. A memory management unit (MMU) 92 therefore swaps pages of data into memory when they are needed and out to mass storage (such as to disk) when they are not. Handling of page faults that may occur in this context is described in U.S. Patent Application Publication No. 2010/0274876, which is herein incorporated by reference.

Once HCA drivers 82 and 86 have registered memory protection keys and virtual address spaces, applications 64, 68 may allocate these regions for their own purposes and may control and change the address translations performed by MPT unit 84 in HCA 56 accordingly. In contrast to the initial, kernel-level memory registration, these application-level memory manipulations require no special permissions, and they are therefore referred to herein as user-mode memory registration (UMR) operations. Because they require no kernel calls, UMR operations generally execute quickly on CPU 58 and make it easier for the application programmer to register and re-register virtual memory for I/O operations. This ease of use is further enhanced by UMR support for indirect memory registration, which allows a number of separate virtual memory segments to be combined transparently into a single, virtually-contiguous region, as explained below.

Applications 64, 68 register virtual memory regions using UMR in the same manner as they send and receive data packets: by writing a work request to send queue 74 of their allocated Queue Pairs 72. This message flow is shown in FIG. 2 with respect to guest application 68 running in "DOMAIN Z." The UMR work request may have the same general format as a SEND or WRITE work request, for example, but contains an operation code identifying it as a UMR request and a payload indicating the memory key(s) and region(s) to be registered, along with any necessary control information.

When the WQE corresponding to the UMR work request reaches the head of queue 74, HCA 56 recognizes and passes it to MPT unit 84 for execution. The MPT unit checks that memory region and access rights requested in the UMR work request are in accordance with the memory regions and rights that were originally registered to HCA driver 82 and do not conflict with other, existing registrations. Upon completing these checks successfully, MPT unit 84 acknowledges the new memory registration by writing a suitable CQE to completion queue 78. In the event of an access violation, however, MPT unit 84 will send a failure notification to the application.

Upon receiving the CQE, application 68 may proceed to submit one or more work requests to send or receive data from or to the registered virtual memory region, using local or remote memory access. When these data operations are completed, application 68 may submit an invalidation work request, to invalidate the memory key that it has used and free the corresponding memory region(s) for other users.

Address Translation with Indirection.

Figure 3:
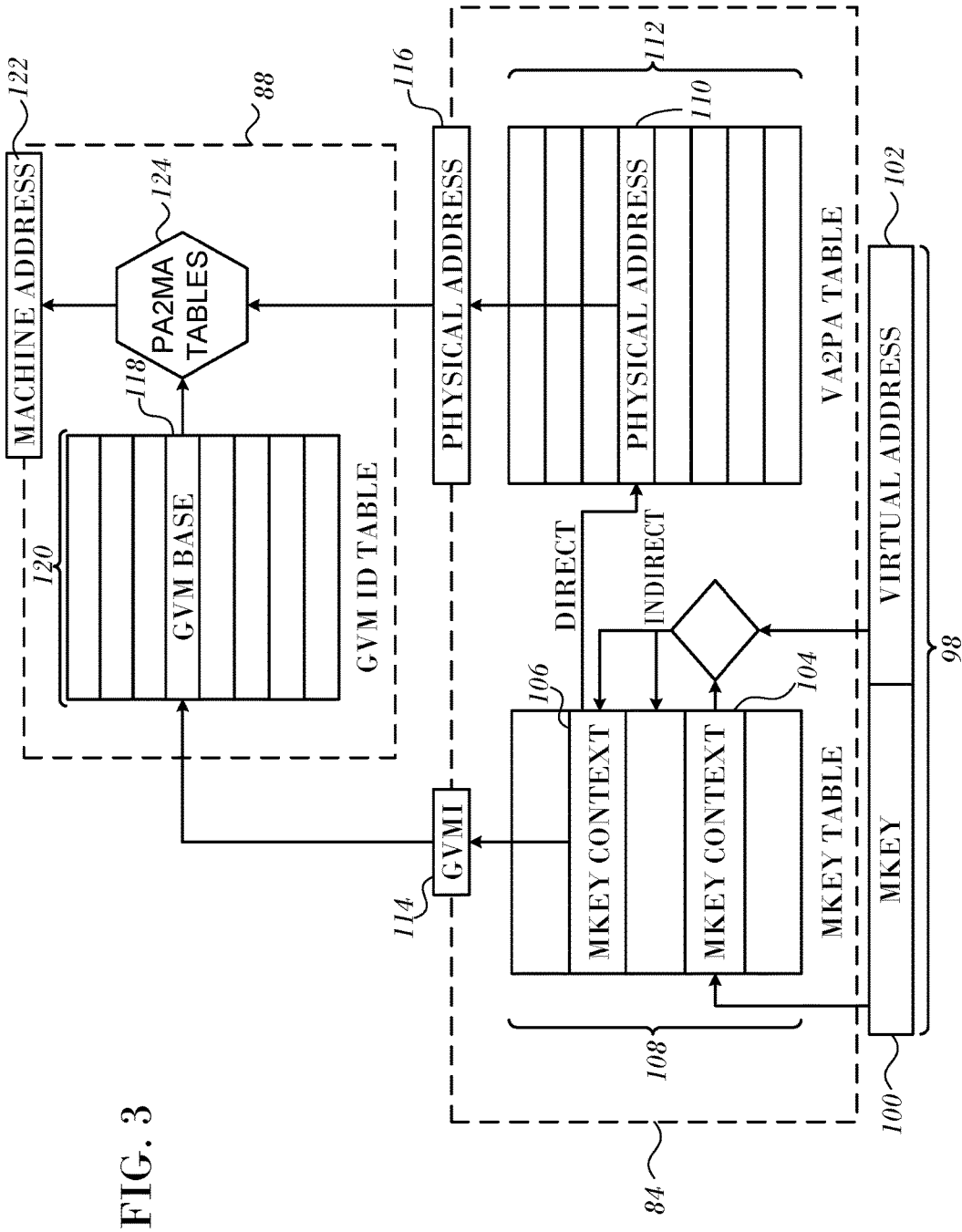
FIG. 3 is a block diagram that schematically illustrates memory translation and protection tables, in accordance with an embodiment of the present invention.

FIG. 3 is a block diagram that schematically illustrates the operation of translation and protection tables in HCA 56, in accordance with an embodiment of the present invention. The figure illustrates a multi-stage translation process, which is carried out in MPT unit 84 and IOMMU 88. The process may be carried out by processing circuitry within a host bus interface of HCA 56 or within a protocol processor. Both of these elements of the HCA may be considered a part of the packet processing hardware circuitry for the purposes of the present description and claims.

As noted above, WQEs serviced by HCA 56 on a given QP (including UMR WQEs) specify locations in memory by means of an access address 98 comprising a memory key (MKey) 100 and a virtual address 102. The memory key points to MKey contexts 104, 106 in a memory protection table 108. This context serves (at least) two purposes:

It provides the base address for use in the next lookup stage, leading ultimately to a corresponding physical address entry 110 in a memory translation table 112.

It provides a guest virtual machine identifier (GVMI) 114 for use by IOMMU 88.

Tables 108 and 112 are provided in MPT unit 84 for each virtual machine 66 and are written to HCA 56 initially by the HCA driver 82 in that virtual machine. Thus, a "physical address" 116 that is output by table 112 for a QP of a virtual machine is not actually a machine address in memory, but is rather a virtual address in the address space of that virtual machine, as explained above. The exception to this generalization is for QPs assigned to host domain 62, for which physical address 116 is a machine address. (The host domain typically has its own GVMI, which is commonly set to zero.) IOMMU 88 comprises an address translation section, as shown in FIG. 3, as well as an attribute translation section (not shown). The functions of these sections are typically (although not necessarily) turned on for QPs belonging to virtual machines 66 and off for QPs belonging to host domain 62. For a given virtual machine, GVMI 114 serves as a key to extract a base address 118 from a GVM identifier table 120. This base address is used in looking up a machine address 122 that corresponds to physical address 116 in physical-to-machine address (PA2MA) tables 124. Tables 120 and 124 are written by HCA driver 86 of host domain 62.

MKey contexts 104, 106 specify, for the corresponding MKey 100, the start address and length of the corresponding region in virtual memory, as well as various items of metadata. In an embodiment of the present invention, these metadata include an "indirect" flag, indicating that the MKey in question is configured for indirect addressing. In conventional, direct addressing, MKey context 106 points directly to physical address 110, which serves as the base address for translation of virtual address 102. In indirect addressing, MKey context 104 points to one or more other MKeys, i.e., an additional layer of virtualization is provided. Thus, upon encountering an indirect MKey in access address 98, MPT unit 84 first looks up the MKey (or MKeys) indicated by MKey context 104 and then uses the context of these latter MKeys along with virtual address 102 in address translation to find physical address 110, as illustrated in FIG. 3.

This sort of indirect memory registration and lookup is particularly convenient when used in conjunction with UMR, as it facilitates safe, flexible application-level memory registration. It may similarly be used, however, in kernel-mode (protected) memory registration schemes.

Although only a single level of MKey indirection is shown in the figures, indirect MKeys may alternatively point to other indirect MKeys, leading to multiple corresponding stages of address translation.

InfiniBand Overview.

The InfiniBand Trade Association defines the InfiniBand Architecture (IBA), a standard communication architecture for network-based inter-process communication. The specification defines Scatter/Gather Elements (SGE) associated with work requests. Each work request may have several such SGE associated with it, with each entry defining a contiguous region of memory. Such lists are associated with a work request and not with a memory region. Therefore, when using SGE lists, the target memory of an RDMA write operation must be contiguous.

Support for hardware-level gather/scatter capabilities in the arrangement shown in FIG. 2 provides a mechanism for defining new memory keys, which describe non-contiguous regions of virtual memory. Such non-contiguous memory regions must be defined on regions previously registered with a HCA. As such, all operations on regions of memory described by memory keys can operate on regions of non-contiguous memory. The memory keys are defined by an operation posted to a send queue, and are local operations that do not involve any network communication.

A work request to setup such a memory-key may be posted to a send queue, followed by a network operation using the memory key, with no need for waiting on a send completion entry by the operation to define the memory key to appear in the completion queue.

Two types of memory regions may be defined, one that is similar to the standard Unix iovec structure shown in Listing 1, and is a concatenation of several contiguous regions. The second type is defined by interleaving several regions of non-contiguous memory, each described by a regular expression that includes a base pointer, the size of the repeat unit, and the distance between these elements. A common repeat count is used to describe the number of elements taken from each region. Both types are handled advantageously by the scatter/gather capabilities of the apparatus shown in FIG. 2.

Listing 1

```
struct iovec {
    void *iov_base;/**< base address of data*/
    size_t iov_len;/**< size of this piece*/
};
```

Figure 4:
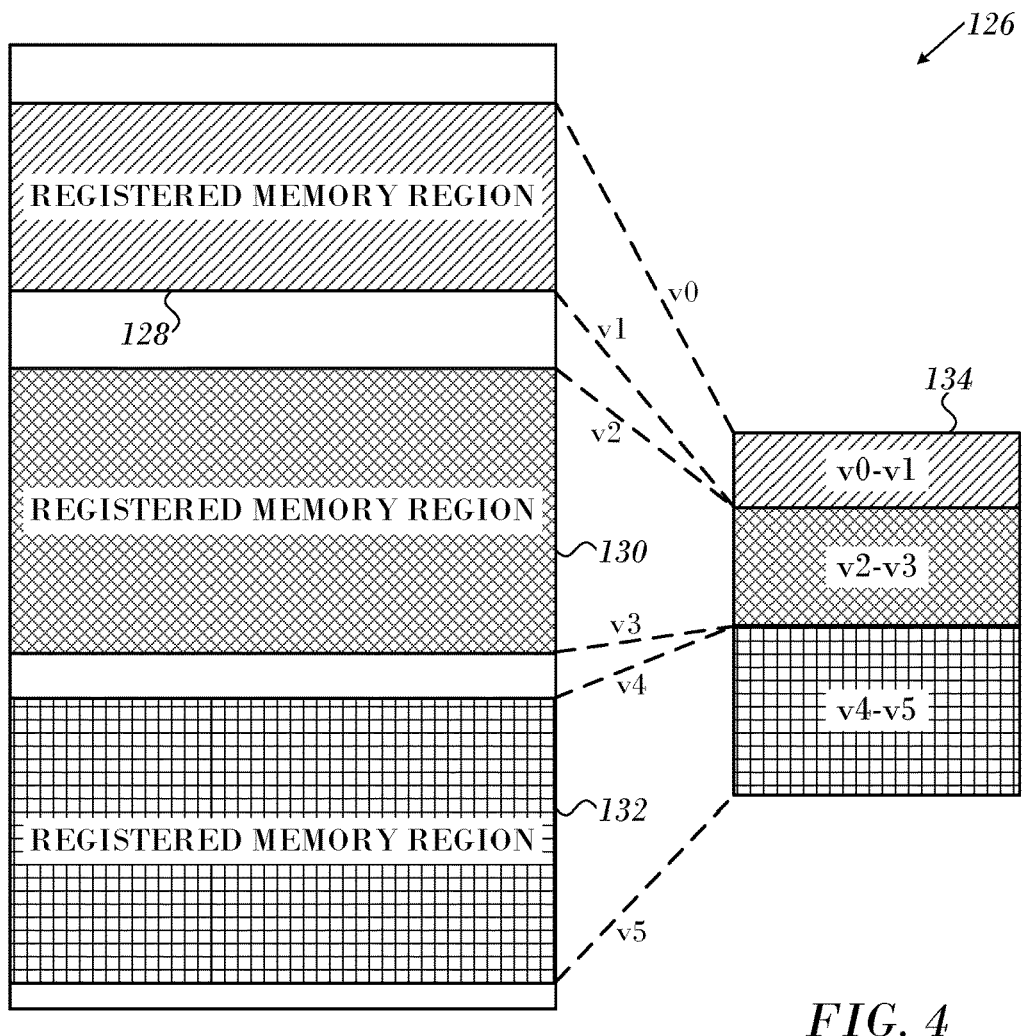
FIG. 4 illustrates a memory region, which can be processed in accordance with an embodiment of the invention.

Reference is now made to FIG. 4, which is a graphical display of memory regions, which can be represented by the data structure of Listing 1 in accordance with an embodiment of the invention. Portion 126 at the left side of the figure includes three contiguous virtual memory region 128, 130, 132. Each of the virtual memory regions 128, 130, 132 is referenced by a respective memory key. Virtual memory region 134, referenced by its own memory key, is a concatenation of the virtual memory regions 128, 130, 132.

Figure 5:
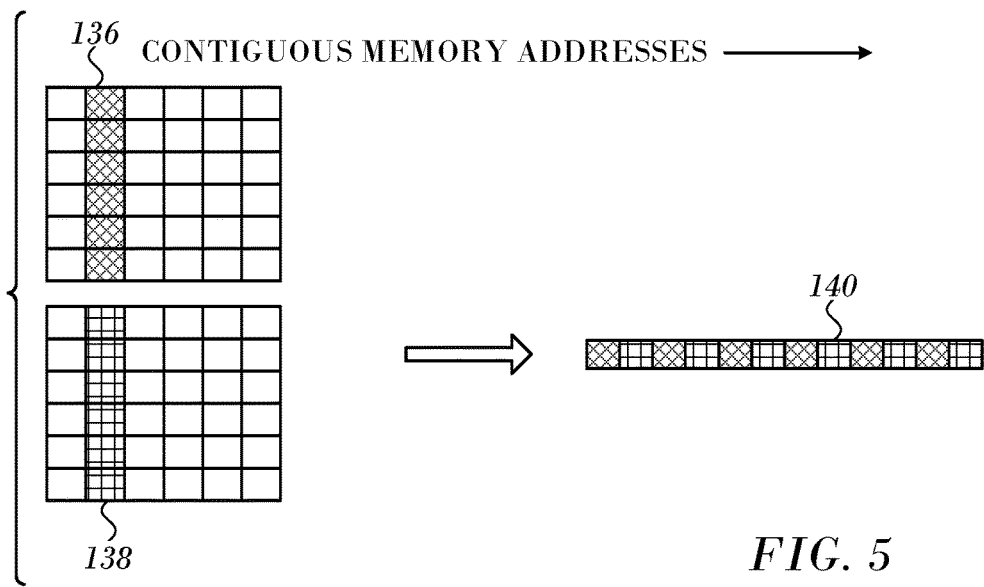
FIG. 5 illustrates a memory region in accordance with an embodiment of the invention.

Reference is now made to FIG. 5, which illustrates the second type of memory region, which can be processed by an embodiment of the invention. This type may include any number of noncontiguous memory regions. They are represented by two memory regions 136, 138 for simplicity of presentation. Each such memory region can be described by a regular expression that includes a base pointer, size of a repeat unit, and the distance between these elements. A common repeat count is used to describe the number of elements taken from each region. The stride and size that describe each of the contributing elements may be different, although in FIG. 5, the size of the element from each region, and the distance between elements is the same. Memory region 140 represents an interleaving of the memory regions 136, 138.

Performance of Hardware Scatter/Gather.

It will be helpful to understand the performance characteristics of the scatter/gather hardware relative to packing data into a contiguous buffer (referred to herein as "packed data") before sending it. Several ping-pong experiments were performed, in which the data was repeatedly exchanged between sender-receiver pairs. The source data was non-contiguous, but had a regular structure as in the memory regions 136, 138. The destination data was contiguous. The repeat block size varied from 1 byte to 8 kbytes and the block count from 1 to 2048, doubling in size at each step. Both hardware scatter/gather and packing based versions of the test were run.

Figure 6:
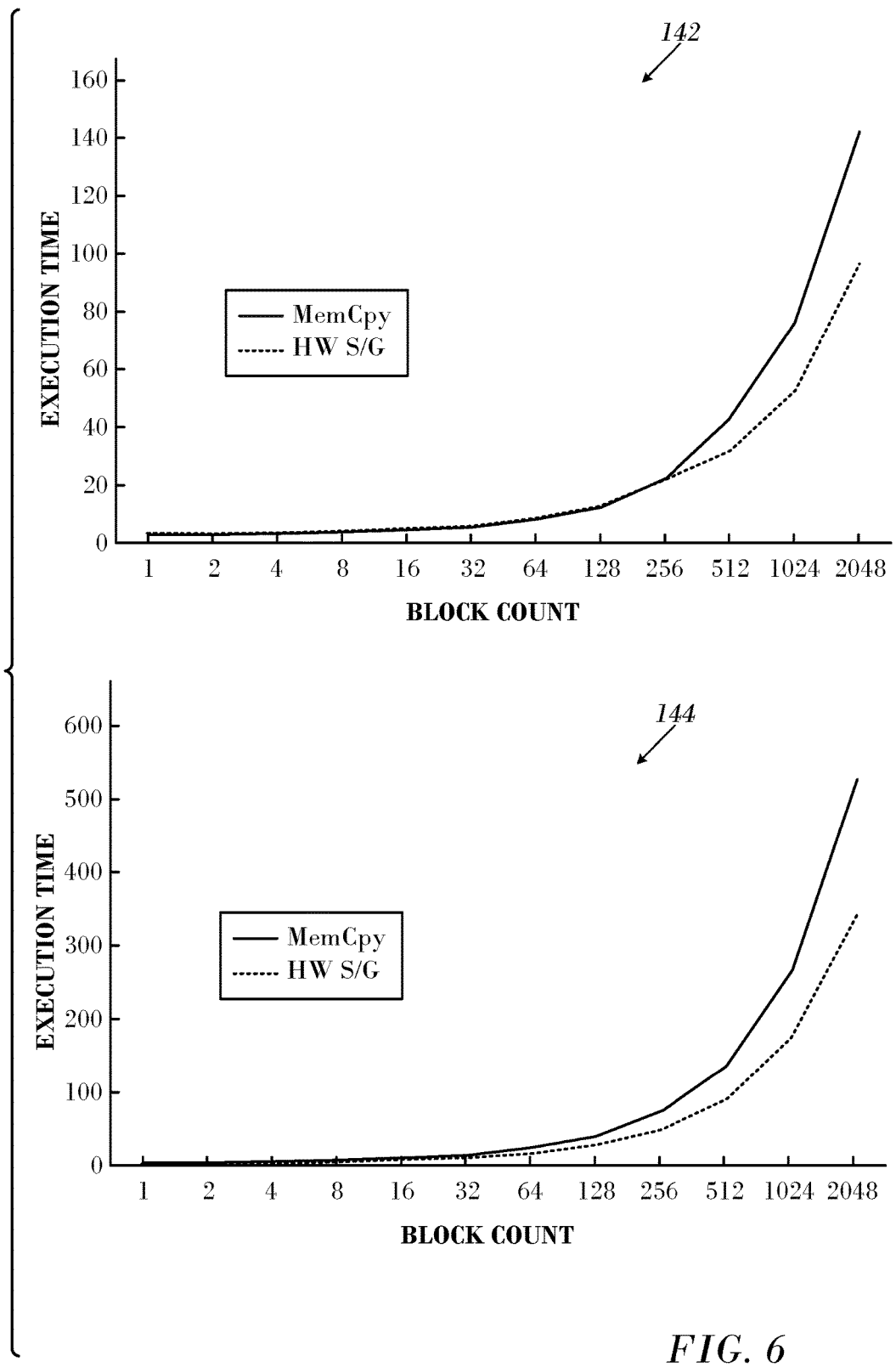
FIG. 6 is a set of two graphs illustrating the effect of block size in accordance with an embodiment of the invention.

Reference is now made to FIG. 6, which is a set of two graphs 142, 144 illustrating the effect of block size in accordance with an embodiment of the invention. The block size was set at 128 and 512 bytes in the graphs 142, 144, respectively.

Figure 7:
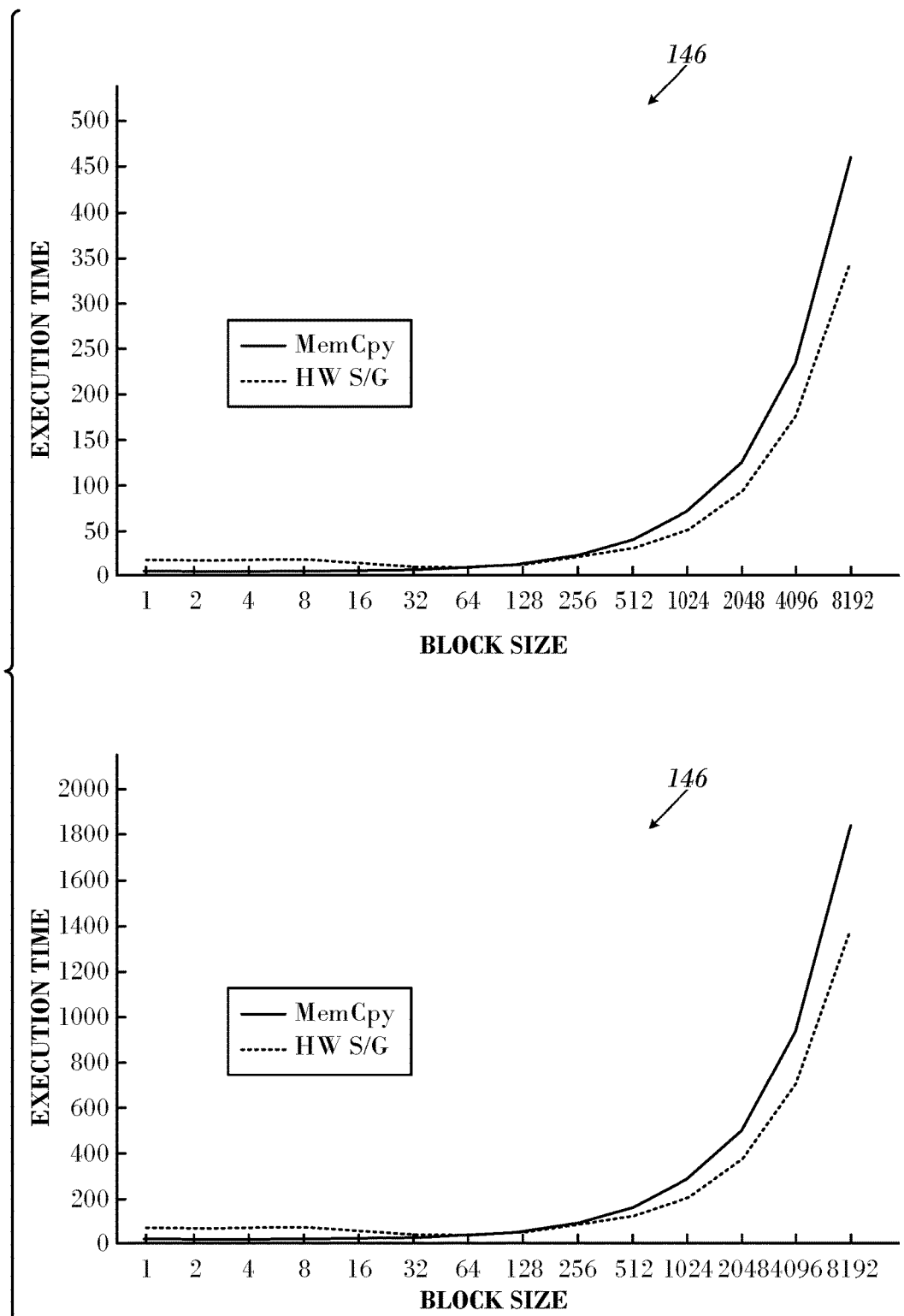
FIG. 7 is a set of two graphs illustrating the effect of packing and block size in accordance with an embodiment of the invention.

Reference is now made to FIG. 7, which is a set of two graphs 146, 148 illustrating execution times for different block sizes in accordance with an embodiment of the invention. FIG. 7 is similar to FIG. 6. In FIG. 7 the block sizes was again set at set at 128 and 512 bytes, but now the blocks were packed before sending.

Both FIG. 6 and FIG. 7 show that packing large block sizes, as well as packing many blocks can be done efficiently when using hardware scatter/gather. As the blocks become larger and numerous, using memory copies is less efficient than using hardware scatter/gather. For a block size of 128 bytes, the crossover point is at a block count of 256, and for 512 bytes hardware scatter/gather at a block count of 4. The larger the block size, the more efficient hardware scatter/gather is relative to packing, and thus fewer blocks are needed to have better performance than when using memory copies.

FIG. 7 shows that for a block count of 128, the packing execution time increases over that of hardware scatter/gather starting with a block size of 256, while for a block count of 512 this happens at a block size of 128. The same overall trend as for a fixed block size is seen for a fixed block count, however, the efficiency of the hardware scatter/gather capability increases more slowly with the increase in the block count.

For a block size of 32 bytes, the crossover point is around at about 2K data blocks, and for a 32K block size using the hardware scatter/gather is always better than packing the data.

The all-to-all algorithm starts by sending a large number of small blocks, each the size of the user's data block. With each step, block size increases by a factor of k, the radix of the algorithm, and the number of blocks decreases by the factor k. Thus, with increasing step number, the hardware scatter/gather capabilities provide an increased performance benefit, once the block sizes become sufficiently large.

The Basic Bruck Algorithm for All-to-All Operations.

A brief summary of an algorithm presented in the above-noted Bruck Article (Efficient algorithms for all-to-all communications in multi-port message-passing systems) will facilitate understanding of the principles of the present invention.

Bruck assumes a model of a fully connected message passing system of n processors, in which the performance of any point-to-point communication is independent of the sender-receiver pair. Each processor has k≥1 ports, through which it can send and receive k messages in every communication round.

In an operation referred to as an "index operation", also known as "MPI alltoall", initially each of the n processors has n blocks of data. The goal is to exchange the $i^{th}$ block of processor j with the $j^{th}$ block of processor i. The algorithm features a trade-off between communication start-up time and the data transfer time.

Figure 8:
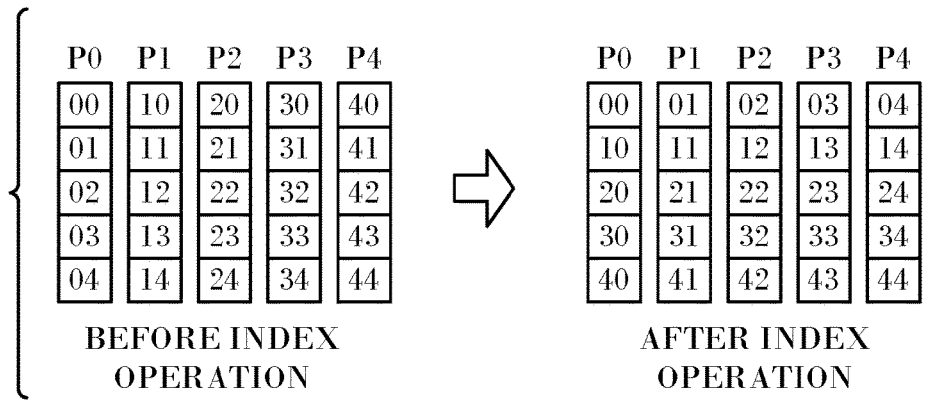
FIG. 8 illustrates processor-memory configurations before and after an index operation in accordance with the prior art.

Reference is now made to FIG. 8, which illustrates an example of the processor-memory configurations before and after the index operation for n=5 processors. The notation "ij" in each box represents the $j^{th}$ data block initially allocated to processor $p_i$. The label j is referred to as the block-id.

In general, a class of algorithms for the index operation among n processors can be represented as a sequence of processor memory configurations. Each processor-memory configuration has n columns of n blocks each. Columns are designated from 0 through n−1 from left to right and blocks from 0 through n−1 from top to bottom. Column i represents processor $p_i$, and block j represents the $j^{th}$ data block in the memory offset. The objective of the index operation is to transpose these columns of blocks.

The index algorithm consists of three phases (sometimes referred to herein as Bruck Phases 1-3):

Phase 1. Each processor $p_i$ independently rotates its n data blocks i steps upwards in a cyclical manner.

Phase 2. Each processor $p_i$ rotates its jth data block j steps to the right in a cyclical manner.

Phase 3. Each processor $p_i$ independently rotates its n data blocks i steps downwards in a cyclical manner.

Figure 9:
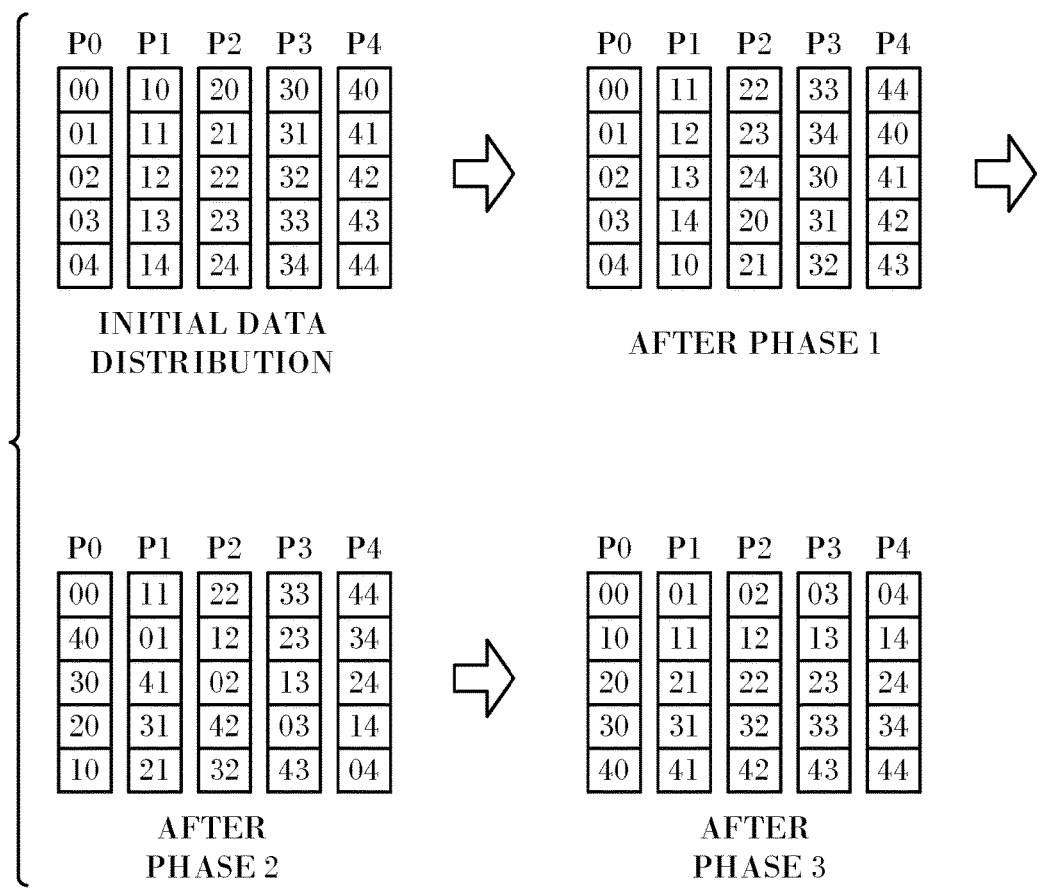
FIG. 9 illustrates data movements in the three phases in accordance with the prior art.

Reference is now made to FIG. 9, which summarizes the data movements in the three phases. The implementation of Phases 1 and 3 on each processor involves only local data movements and is straightforward. The rotation of Phase 2 is implemented by interprocessor communication.

Phase 2 decomposes into a sequence of point-to-point communication rounds, assuming a one-port model and using a parameter r (for radix) in the range 2≤r≤n. For convenience, we say that the block-id of the $j^{th}$ data block in each processor after Phase 1 is j. Consider the rotation required in Phase 2. Each block with a block-id j in processor i needs to be rotated to processor (i+j) mod n.

The block-id j, where 0≤j≤n−1, can be encoded using radix-r representation using $w=\text{ceil}(\log_r n)$ digits. For convenience, we refer to these w digits from zero through w−1 starting with the least significant digit. The algorithm for Phase 2 consists of w subphases corresponding to the w digits. Each subphase consists of at most r−1 steps, corresponding to the (up to) r−1 different non-zero values of a given digit. In subphase x, for 0≤x≤w−1, Step 1 through Step r−1 iterates as follows:

During Step z of subphase x, where 1≤z≤r−1 and 0≤x≤w−1, all data blocks, for which the $x^{th}$ digit of their block-id is z, are rotated $z\,r^x$ steps to the right. This is accomplished in a communication round by a direct point-to-point communications between processor i and processor (i+z×rx) mod n, for each 0≤i≤n−1.

Note that, after w subphases, all data blocks have been rotated to the correct destination processor as specified by the processor id. However, data blocks are not necessarily in their correct memory locations. Phase 3 of the algorithm fixes this problem.

All-to-All Data Exchange Patterns.

The all-to-all algorithms according to embodiments of the invention disclosed herein are derived from the Bruck algorithm for small data all-to-all personal exchange. The Bruck algorithm described above employs an optimization scheme known as aggregation, which achieves relatively low latency at the cost of using more bandwidth. The algorithms according to the invention achieve low latency while using memory in a more cost-effective way by 1) lowering the operation latency by using the network's scatter ability to access non-contiguous memory directly, rather than using the CPU to first pack the data, and then have the network access this copy; and 2) exploiting the network's scatter ability to deliver data to memory and to form large contiguous blocks without requiring a copy operation by the CPU to form such blocks.

The communication pattern between MPI ranks is the same in all variants of the algorithm, with the differences occurring in how temporary data is laid out in memory, and how data is prepared for network transfer.

This section describes the pattern of point-to-point communication used to implement the all-to-all algorithms. The process is referred to herein as "block-wise data exchange".

The algorithms are characterized by a radix k, with data exchanges occurring with k−1 ranks at each step. The number of steps in the algorithm, s, for a communicator of size N is $s=\text{ceil}(\log_k(N))$.

Defining the parameter n as $n=\text{floor}(\log_k(N))$, the total number of messages sent and received, sr is $sr=n*(k-1)$, and if n is not equal to s, e.g., when the number or ranks in the communicator, N, is not $k^i$, where i is some integer, there are srAdd additional data exchanges, occurring at the last step, where $\text{srAdd}=1+(N-n^k-1)/(k^n)$.

If N is less than or equal to k, there is just a pairwise exchange of data between all processes.

At step number sn, with a zero based numbering scheme, and send number i, where 0<=i<k, but ensuring we do not exceed the total number of messages to be sent, the destination process, dest, is given by $\text{dest}=(\text{myRank}+(i+1)*k^{sn})\%N$ At step number sn, with a zero based numbering scheme, and receive number i, where 0<=i<k, but ensuring we do not exceed the total number of messages to be received, the source process, src, is given by $\text{src}=(\text{myRank}-(i+1)*k^{sn}+N)\%N$.

At each step in the algorithm, the data sent to a process dest includes all local data destined for that process, as well as to subsequent processes that will receive data from the process dest, whether directly, or as the result of further data forwarding in subsequent steps of the algorithm. The data being sent includes both original local input user data, as well as data received in previous steps, as part of the data aggregation.

At a given step, and receive i, where i<k, the data received is destined to processes $\text{myRank}+d*k^{step+1}$ where $d=0,1,\ldots,\text{floor}(N/k^{(step+1)})$.

Data for these sources is received from k−1 process, with the receive i including data originating from ranks $\text{rankHigh}=\text{myRank}-(i+1)*k^{step}$, and)

$\text{rankLow}=\text{rankHigh}-k^{(step+1)}+1$, where $i=0,1,2,\ldots,k-1$ with MPI rank wraparound taken into account in determining actual MPI ranks, and making sure that at the last step, when N is not an integer power of k, that data is not sent a second time at the last step.

Memory Layout.

The degree to which the optimizations in the algorithms presented here are effective in reducing overall algorithm execution time depends on the efficacy of the hardware scatter/gather capabilities, relative to CPU-based data packing. Whether one uses the hardware data gathering capabilities or packs the data before it is sent, data on the wire is a contiguous stream of bytes with a length that is independent of the method used to prepare such data for transmission. A description of three memory data patterns used for implementing the Bruck algorithm follow.

First Alternate Embodiment (Bruck-Like Data Layout).

Figure 10:
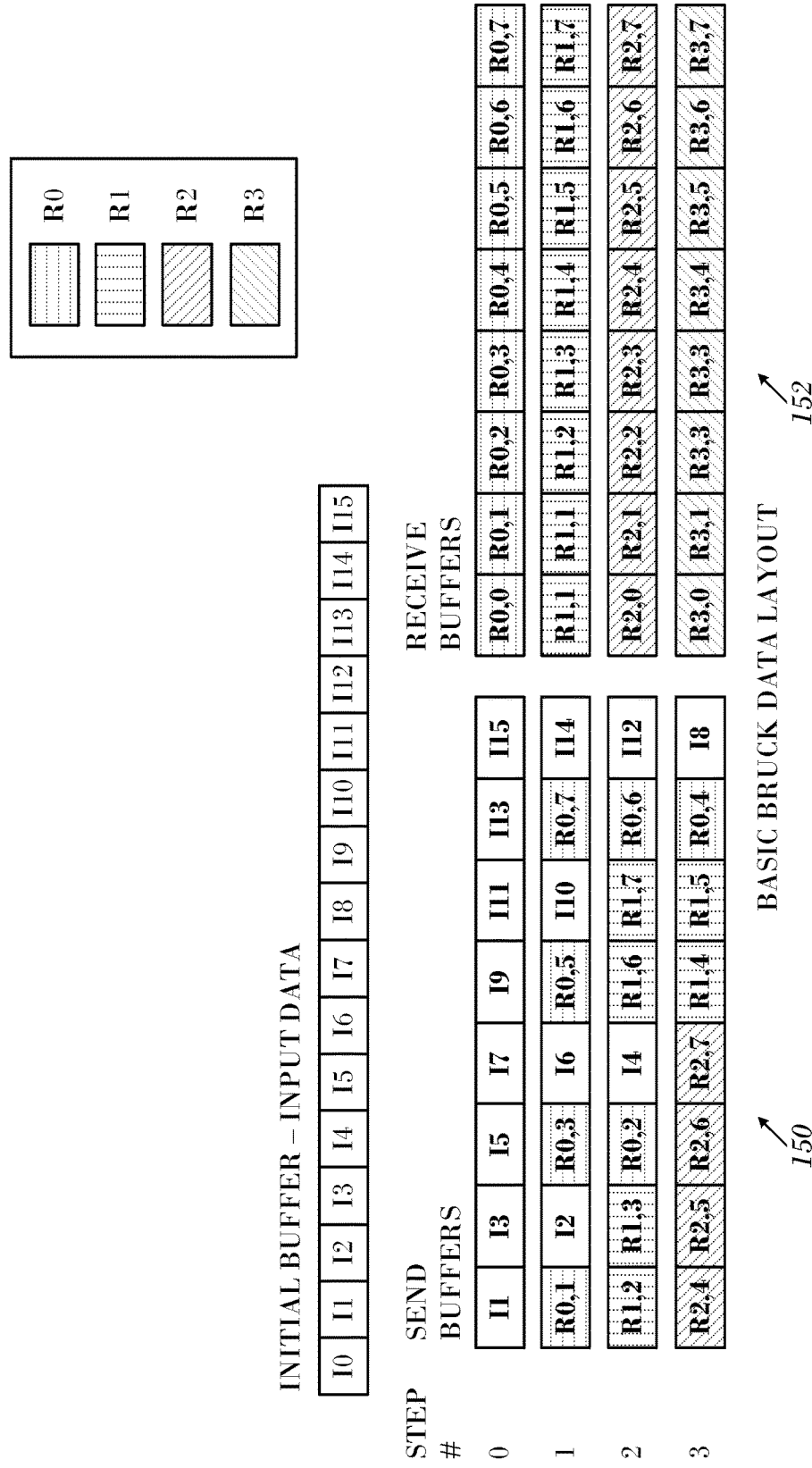
FIG. 10 is a diagram showing a data layout, which is processed according to an embodiment of the invention.

Reference is now made to FIG. 10, which is a diagram showing a data layout according to the original Bruck algorithm, which is processed according to an embodiment of the invention. This example models 16 processes, using radix 2. Left column 150 of buffers represents the data layout of the buffer sent at each step of the algorithm, and right column 152 on the right represents the buffer received at each step.

The hatching pattern of each block in the send buffers represents the buffers from which the data originates. The data sent at each step s uses data from the original local input buffer, as well as data received in each of the previous steps, with the data interleaved to keep data destined for the same MPI rank together. FIG. 9 is a view of how data is conceptually interleaved, with some data packed into a contiguous buffer, and other gathered by the InfiniBand hardware according to criteria described below. Data is received in destination buffers in the order it is sent on the network. Whether a particular block of data is packed data or gathered data depends on the actual data size in that block.

Second Alternate Embodiment (Shuffle Data Pattern).

Figure 11:
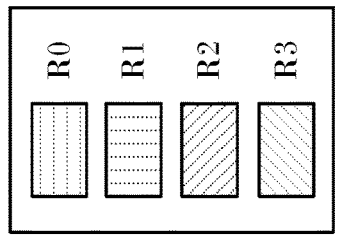
FIG. 11 is a diagram showing a data layout according to a shuffle algorithm, which is processed according to an embodiment of the invention.

Reference is now made to FIG. 11, which is a diagram showing a data layout according to a shuffle algorithm, which is processed according to an embodiment of the invention. This example models 16 processes, using radix 2. For this data pattern, before any data is exchanged, the data is re-ordered to group data that will be sent at every step of the algorithm.

The algorithm consists of s nested loops starting at s=0, where s is the total number of steps. We define $c_s=k^s$. Each loop iterates from j=0 to k−1, where k is the radix of the algorithm. The rank of the remote processes, $p_r$, are generated in an order for which data that will be sent to a single destination and are all grouped together in a consecutive manner:

$$p_r = \Sigma_{i=0}^{s-1} k^i j_i,$$

where $j_i$ is the is the value of j in loop number i, where the outermost loop is labeled as loop 0.

Left column 154 of buffers represents the data layout of the buffer sent at each step of the algorithm, and right column 156 represents the buffer received at each step. The data sent at step s uses data from the local shuffled buffer, as well as data received in each of the previous steps, with this data interleaved to keep data destined to the same MPI process together. The data shuffle does not avoid the need for the data interleave.

Third Alternate Embodiment (Scatter Data Pattern).

Figure 12:
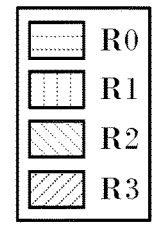
FIG. 12 is a diagram showing a data layout according to a scatter algorithm, which is processed according to an embodiment of the invention.

Reference is now made to FIG. 12, which is a diagram showing a data layout according to a scatter algorithm, which is processed according to an embodiment of the invention. This example models 16 processes, using radix 2. In this algorithm, data is sent directly from the buffers into which that data arrives. The initial user data is copied to the proper location in the data buffers, and the arriving data at each step uses the hardware scatter/gather capabilities to scatter the data to the appropriate location in the buffers.

In the scatter algorithm, data that is delivered to the location from which it will be sent in the next step is interleaved with data that arrived in previous steps of the algorithm. It will be delivered to all buffers that will be used in subsequent steps. FIG. 12 shows the pattern. The initial data is to be scattered to all buffers 0-3, with buffer 0 being sent in step 0, and data arriving in this step being scattered to buffers 1-3, with some data destined to the local process. In step 1, the data in buffer 1 is sent, and arriving data is scattered to buffers 2 and 3, with some data destined to the local process. In step 2, data in buffer 2 is sent, and the arriving data is scattered to buffer 3, with some data destined to the local process. In step 3, data from buffer 3 is sent, and all arriving data is targeted to the local process.

Coding according to the hatch pattern key in FIG. 12 is used to indicate at which step the local process receives the data, with the no hatching indicating local input data, the pattern R0 indicating data arriving at step zero, pattern R1 indicating data arriving at step one, and the pattern R2 indicating data arriving at step two. Data destined for the local process is also scattered to the appropriate location, and is not shown in this figure. With this approach, at step i the buffers from previous steps do not contain any live data, i.e., data that arrived in previous steps in the algorithm and is to be forwarded to other destinations in subsequent steps.

Handling of Non-Contiguous Data.

Implementation of the algorithms using the foregoing data patterns described can use either memory copies or the hardware scatter/gather capabilities to manipulate data as it is forwarded to its final destination. In addition to latency optimization, it is also desirable to use HCA hardware scatter/gather capabilities and free up CPU resources for computation. However, the hardware scatter/gather performance relative to the cost of memory copies varies as a function of block size, and must be taken into account in algorithm implementation.

Implementation Details.

Algorithms using the data layouts shown in FIG. 10, FIG. 11 and FIG. 12 have been implemented using a combination of memory copies to pack the data, using the hardware scatter/gather capabilities to gather the data before it is sent, and scatter it at the destination, as required by each algorithm. Blocks of data that are smaller than a run-time specified size are interleaved and packed into a single buffer, and then sent, while blocks of data above that size are gathered and inter-leaved using the hardware scatter/gather capabilities. Thus, a single implementation is used to explore the full range of balance between using memory copies and the hardware scatter/gather capabilities. In addition, in order to improve algorithm performance, data packing and data transfer are overlapped, i.e., occur concurrently, where possible.

Listing 2

```
function All-to-all hybrid(threshold)
    Create the memory keys for the non-contiguous data
    Post the receive buffers
    if memory copies are to be used then
        Pre-pack data for step 0
    end if
    for each step i of the algorithm do
        if can use hardware scatter/gather capabilities at step i then
            Post send using hardware scatter/gather capabilities
        end if
        if need to use only memory copy then
            ($k^{max(0;i-2)}$ < threshold)
            Finish packing data step i
            Send the data
            Pre-pack data for step i+1
        else if need to combine memory copy
```

Listing 2

```
            with hardware scatter/gather (k^{max(0;i-2)} ≥ threshold)
                Send the data for existing buffers
            end if
            Wait for current step receives to complete
        end for
end function
```

At a high-level, all algorithms except the pattern in FIG. 12 operate using the algorithm shown in Listing 2. Some pairwise interprocess synchronization is necessary to ensure resource availability, but these details are omitted.

Figure 13:
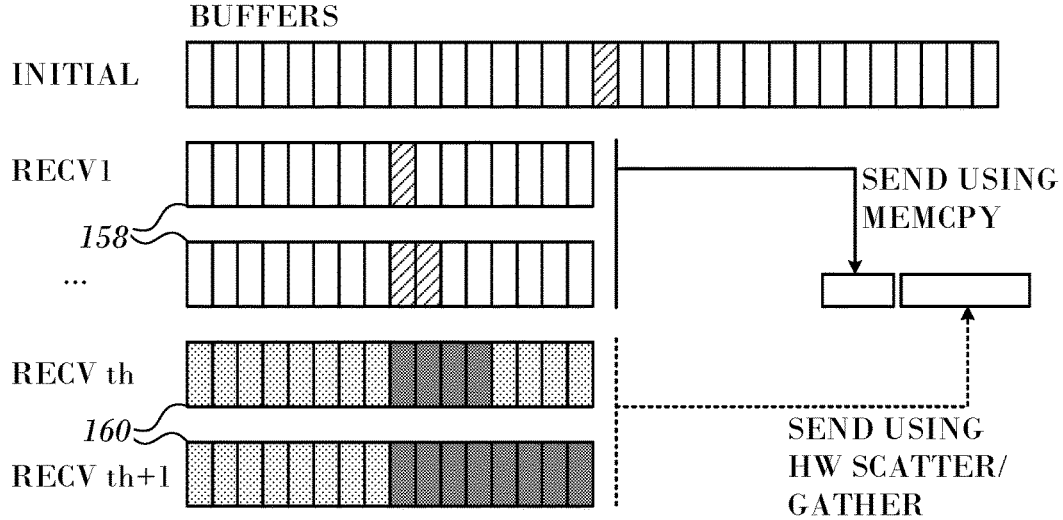
FIG. 13 is a graph illustrating an algorithm methodology in accordance with an embodiment of the invention.

Reference is now made to FIG. 13, which is a graph illustrating algorithm methodology in accordance with an embodiment of the invention. A radix of 2 is employed. Hatching patterns 1 and 2 in the key represent the elements from the input buffer (top line) and from previous receive buffers (subsequent lines) that need to be sent in the current step. Data is gathered into the send buffer using memory copy for buffers 158 and using hardware scatter/gather (hatching patterns 3 and 4) for buffers 160.

More specifically, data in the buffers 158 (hatching patterns 1, 2) is copied using a memcpy function, into an output buffer (not shown) in preparation for the send. The hardware then gets a description of the data to send that includes the copied data and data in the buffers 160 (hatching patterns 3, 4). The hardware gets the data directly out of the buffers 160 without first having the data copied to an intermediate buffer.

As indicated above, all algorithms use an input parameter indicating the block size above which hardware scatter/gather capabilities should be used in the data transfer. If the user-input data block size is above this threshold, all data transfers will be handled by hardware, without the need for memory copies. However, if the user-input block size is below this threshold, initial steps will use only memory copies to pack the data, and at some step begin sending the small data blocks by packing those blocks into a contiguous buffer. The larger blocks are sent using the HCA hardware capabilities, as shown in FIG. 13. This is because at each step some data received in each of the previous steps is forwarded, and because the data block size increases by a factor of k at each step.

The algorithm is further enhanced by overlapping communication with data preparation where possible. Memory registration required by hardware scatter/gather is overlapped with packed data in the first step in the algorithm, if needed. In addition, data sent using the hardware scatter/gather capabilities is overlapped by furnishing packed data from the contiguous buffer. Once the overlapping data is sent, the remainder of the data received in the previous step that still needs to be packed is copied to the appropriate location in memory in preparation for subsequent steps.

The scatter data layout in FIG. 12 requires a slightly different algorithm, which is presented in Listing 3.

Listing 3

```
function All-to-all hybrid p3(threshold)
    Register the non-contiguous memory keys
    Post the receive buffers
    if memory copies are to be used then
        Pre-pack data for step 0 just for the first buffer
    end if
    for each step i of the algorithm do
        if can use hardware scatter/gather capabilities at
```

Listing 3

```
            step i (k^{max(0;i-2)} ≥ threshold) then
                Post send using gather capabilities
            end if
            if need to use only memory copy (k^{max(0;i-2)} < threshold) then
                Send the data
                Pre-pack data for step i (if needed)
            end if
        repeat
            Poll for completion
            if receive data for step j requires memory copy then
                Scatter data to all send buffers (if needed)
            end if
        until receive data for step i
    end for
end function
```

The key feature of the Scatter algorithm is that data is delivered directly to the location in memory from which it will be sent at the next step, once the block size becomes large enough. During the interval required to set up the next step, data to be sent in the current step but not yet packed is copied into the send buffer from the user buffer, and then sent. The data transfer from the send buffers is performed while concurrently copying the data received in the previous step into the appropriate send buffers, so that in the next step the received data is already in the correct location. Our experiments show that this data pre-staging is completely hidden during the time required to receive the data for the current step. That is to say that the time required by pre-staging is subsumed into the time required to transfer data over the network, and therefore its contribution to latency is essentially zero. For the steps where hardware scatter/gather is initially used, memory copy is no longer required since all previously received data has been pre-staged.

EXAMPLES

To show the advantage of using hardware scatter/gather to handle the network transfer of non-contiguous data, experiments were performed on several systems with different hardware configurations, as well as different configurations of the hybrid all-to-all algorithms.

Experiments were run on Sandy Bridge, Haswell and Broadwell based clusters. All clusters utilize a fat tree network architecture to construct non-blocking switch configurations.

Jupiter is a Dell PowerEdge R720xd/R720 32-node cluster using Intel Sandy Bridge CPUs. Each node has dual Intel Xeon 10-core CPUs running at 2.80 GHz, 25 MB of L3, 256 KB unified L2 and a separate L1 cache for data and instructions, each 32 KB in size. The system has a total of 64 GB DDR3 RDIMMs running at 1.6 GHz per node. Jupiter uses Mellanox ConnectX-3 FDR 56 Gb/s InfiniBand and Ethernet VPI adapters and Mellanox SwitchX SX6036 36-Port 56 Gb/s FDR VPI InfiniBand switches.

The Haswell platform that was used is referred to as Heimdall and is an HP Apollo 6000 10-node cluster with each node configured with dual Intel Xeon 14-core CPUs running at 2.60 GHz. Each chip has a 35 MB L3 cache, 256 KB unified L2 and a separate L1 of 32 KB. The memory used by this system is 64 GB DDR4 RDIMMs running at 2.133 GHz. The network uses Mellanox ConnectX-3 FDR 56 Gb/s InfiniBand and Ethernet VPI adapters and Mellanox SwitchX SX6036 36-Port 56 Gb/s FDR VPI InfiniBand switches.

Thor is a Dell PowerEdge R730/R630 36-node cluster with a Broadwell platform, each node having dual Intel Xeon 16-core CPUs running at 2.60 GHz. Each chip has 40 MB of L3, 256 KB L2 and an instruction/data separate L1 cache of size 32 KB. As with the previous system, the total memory per node is 64 GB DDR4 RDIMMs running at 2.133 GHz. The HCA used by Thor were Mellanox ConnectX-4 EDR 100 Gb/s InfiniBand adapters and Mellanox Switch-IB SB7700 36-Port 100 Gb/s EDR InfiniBand switches.

Two sets of experiments were run on each system, one using the maximum number of nodes and processes per node (PPN) and the other using 10 nodes and 20 PPN in order to compare the results between platforms. Note that this second configuration represents the greatest common divisor of nodes/PPN for all three clusters. All results represent an average of 200 iterations and are obtained after 100 warm-up iterations. Unless otherwise specified, all results are shown in microseconds.

Comparison to Open MPI.

The memory copy code implemented is based on Open MPI's Bruck algorithm and modified to work directly with InfiniBand verbs. This code provides the baseline Bruck algorithm for investigating the benefits of using the hardware scatter/gather capabilities in the all-to-all algorithms. Thus, before beginning the experiments, the memory copy implementation was compared with Open MPI's all-to-all Bruck algorithm to show that the new code behaves similarly or better than Open MPI's code, and therefore is a good basis for a comparative performance study. Since the comparison focuses on the performance impact of network transfers on the all-to-all algorithm, the use of shared-memory was disabled for the Open MPI/tuned-collectives experiments.

Figure 14:
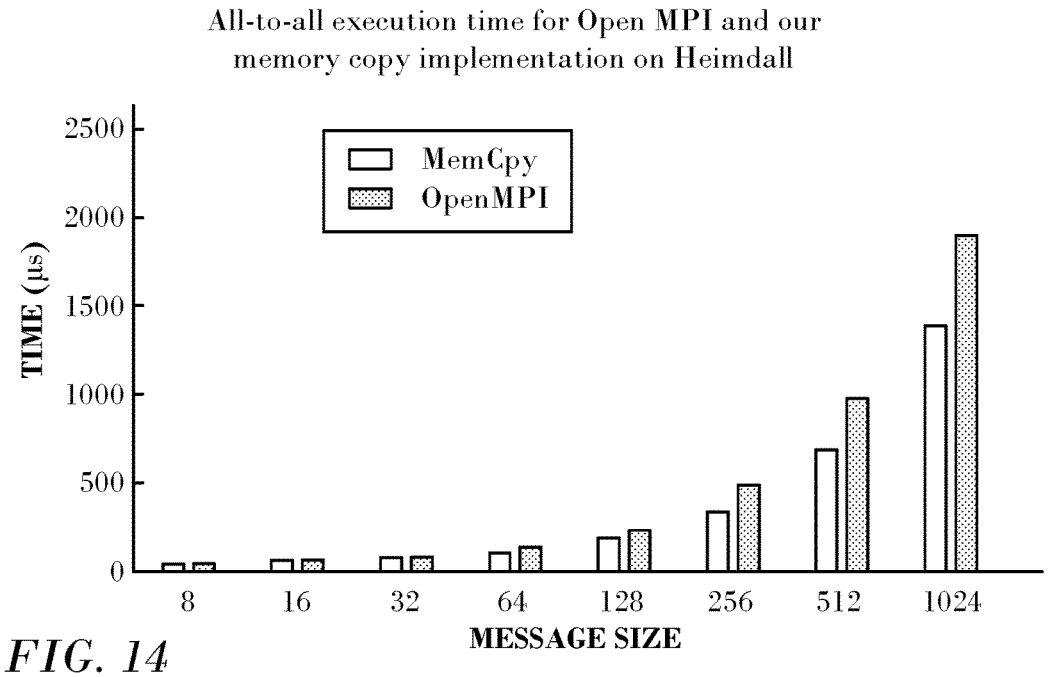
FIG. 14 is a comparison bar graph illustrating all-to-all execution times for different message sizes in accordance with an embodiment of the invention.

Reference is now made to FIG. 14, which is a comparison bar graph illustrating all-to-all execution times for different message sizes in accordance with an embodiment of the invention. The system was Heimdall running on 10 nodes and 20 PPN. OpenMPI/tunedcollectives uses OPAL™ pack/unpack routines while our code only uses memory copy operations directly, so it is expected that our code performs slightly better for large memory copies. For small message sizes, however, both codes behave similarly. There is no scenario under which our baseline code performs worse than Open MPI's Bruck algorithm.

Figure 15:
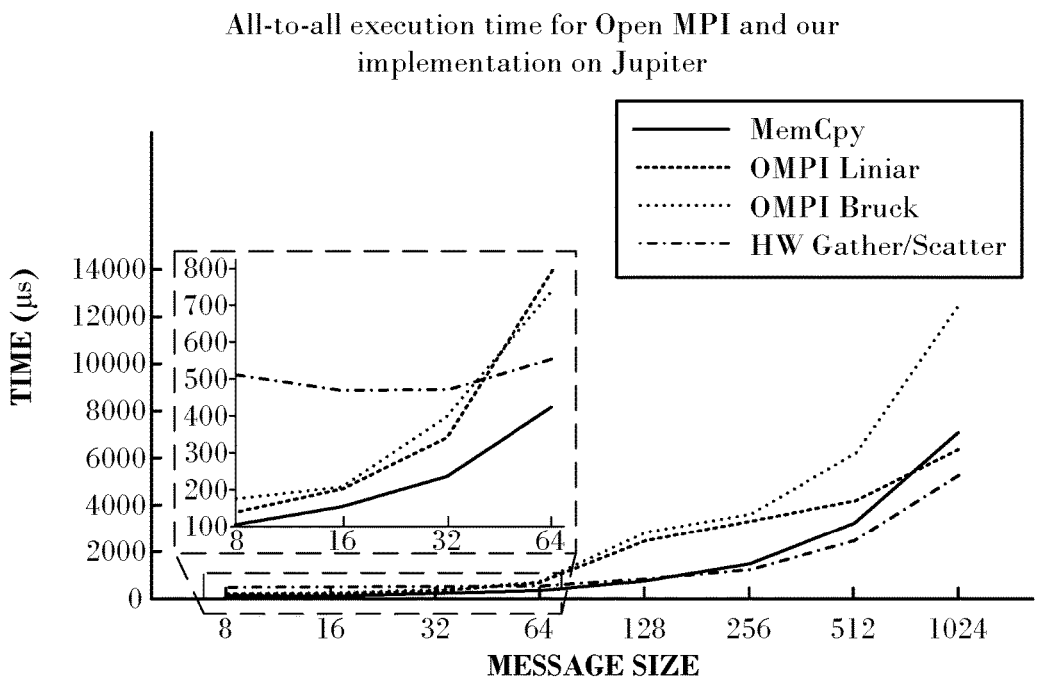
FIG. 15 is a plot of all-to-all execution times in accordance with an embodiment of the invention.

For larger messages, Open MPI's default algorithm is not the Bruck algorithm, but rather a linear implementation of all-to-all that is more efficient when bandwidth becomes the bottleneck. Reference is now made to FIG. 15, which is a plot of all-to-all execution times in accordance with an embodiment of the invention. FIG. 15 shows the execution time for Open MPI's Bruck and linear implementations (without the shared memory optimization) as well as for our code using only memory copy (MemCpy) and using only hardware scatter/gather (HW Gather/Scatter). In order to have a larger memory footprint, the test was run on Jupiter, with 640 processes.

The memory copy Bruck implementation shows similar or better results in most cases. At 1024 bytes the linear algorithm has a slightly lower execution time than the Bruck algorithm. Note that for messages this large, the hardware scatter/gather based algorithm gives better results than all other implementations. Indeed, for even larger data sizes we expect the linear algorithm to perform better than the Bruck algorithms.

Hardware Scatter/Gather.

As mentioned above, the hybrid all-to-all algorithm uses an input parameter that determines at which block size hardware scatter/gather is used for gathering data on the send side, and for scattering it on the receive side. When this threshold is set to zero, this corresponds to using only hardware scatter/gather for all data manipulations. This parameter can also be such that only memory copies are used for these operations. Experiments were run to vary the data manipulation threshold, such that the algorithm varies from using only the hardware scatter/gather capabilities to using only memory-copy capabilities, as well as the inbetween hybrid cases, to study the effectiveness of using the hardware scatter/gather capabilities.

Hardware Scatter/Gather Analysis.

Figure 16:
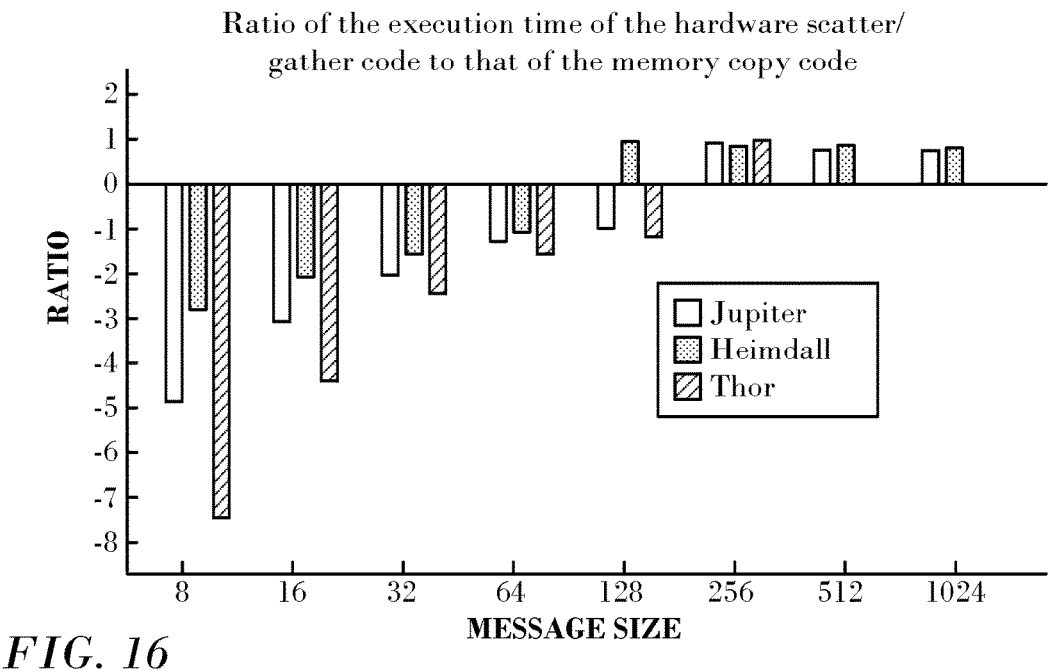
FIG. 16 is a graph of execution times in accordance with an embodiment of the invention.

The performance of the all-to-all original Bruck algorithm was studied on all three systems to understand when they benefit from using the hardware scatter/gather capabilities. Reference is now made to FIG. 16, which is a graph of execution times in accordance with an embodiment of the invention. FIG. 16 shows the ratio of the execution time using hardware scatter/gather to the time it takes for the corresponding memory copy code, for different message sizes. For negative values memory copy performs better, and for positive values hardware scatter/gather performs better.

As expected, for small messages, hardware scatter/gather does not show any benefit compared to simply preparing the send buffers using memory copy. However, with larger message sizes, starting with 128 bytes on Heimdall and 256 bytes on the other architectures, speedups in execution time of up to 26% (for 1024 bytes) are observed. The best results are seen on the Sandy Bridge architecture (Jupiter).

Figure 17:
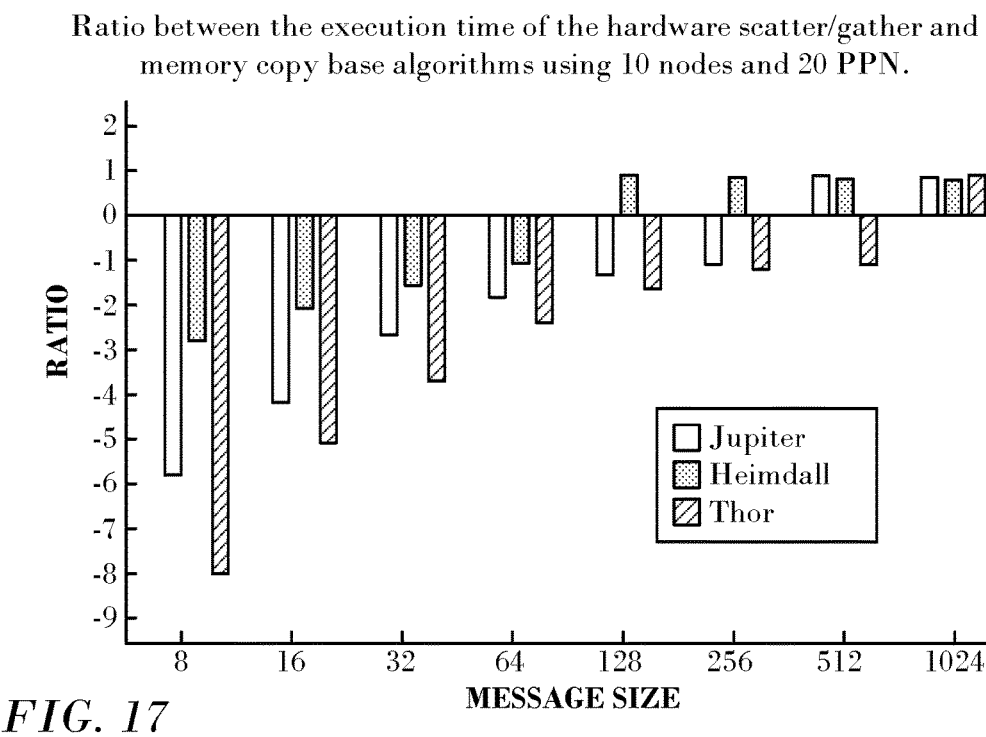
FIG. 17 illustrates the ratio between hardware scatter/gather to a memory copy based algorithm in accordance with an embodiment of the invention.

Heimdall and Thor present similar behavior, but only when considering slightly larger message sizes. Using hardware scatter/gather for all steps outweighs the inefficiencies of the first few steps when the data size exceeds 256 bytes, showing a speedup of up to 20% for 1024 bytes. Note that the runs on the Heimdall system contained only 280 total processes, while on Jupiter we used 640 processes and on Thor 1024 processes. To better compare the behavior on the three clusters, the test was also run using 10 nodes and 20 PPN on all three systems. The results are plotted in FIG. 17 as the ratio between hardware scatter/gather to a memory copy based algorithm.

Larger L3 caches and higher memory speeds make the memory copy more efficient on Haswell and Broadwell platforms, which in turn makes hardware scatter/gather beneficial at larger data sizes (larger than 512 bytes). However, even with these platforms hardware scatter/gather shows significant speedups (up to 12% for 1024 bytes). Overall, the results show that hardware scatter/gather can be beneficial for the all-to-all algorithm even if used for all steps, so long as the message size is large enough. Moreover, 256 and 512 bytes can be seen respectively as 32 and 64 consecutive 8-byte groups, a size that is transferred starting with the 7th and 8th step in an eight byte all-to-all algorithm. Thus, we expect to obtain a speed-up for the hybrid algorithm starting from around the 7th or 8th step. This means that the hardware scatter/gather-based algorithms need at least 128/256 processes in order to benefit from using hardware scatter/gather.

Upper Limit of Speedup for the Hybrid Algorithm.

Figure 18:
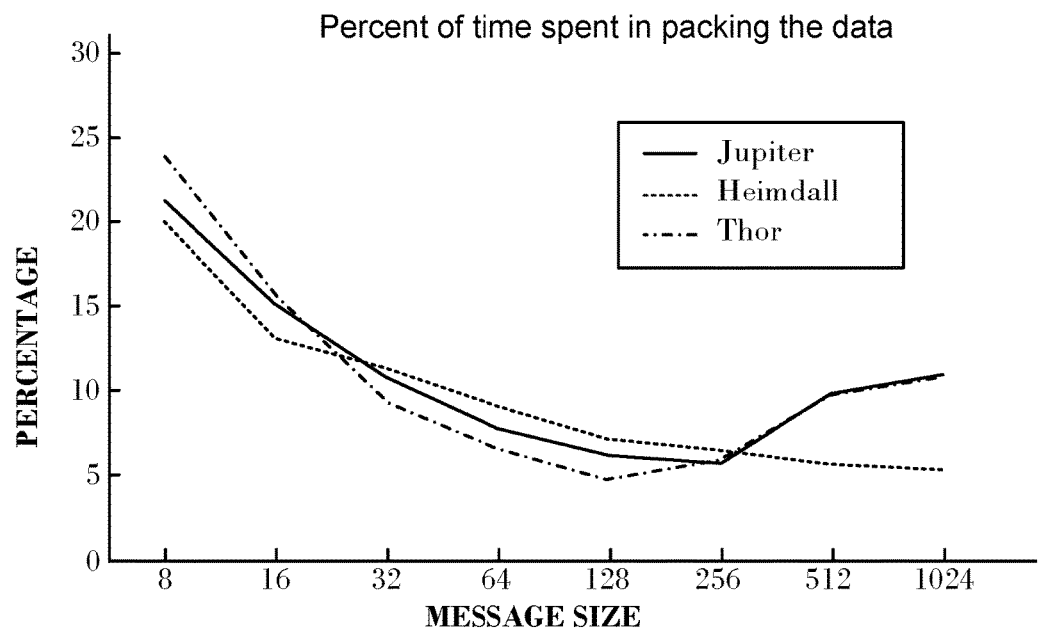
FIG. 18 illustrates time spent in packing the data using memory copy in accordance with an embodiment of the invention.

The hybrid algorithm aims at optimizing the part of the all-to-all algorithm that deals with preparing the data to be sent over the network. FIG. 18 shows the time spent in packing the data using memory copy when using only memory copies. Since a different number of processes was used on each system, the total data volume differs between systems.

For small message sizes, the time to pack the data is in the range of 15% to 24% of the total execution time of the all-to-all algorithm. This represents an upper limit on performance improvement possible using the hardware scatter/gather capabilities.

Messages larger than 32 bytes are more conducive for memory copy operations. The maximum optimization that can be obtained in this case is around 5% to 10% of the total execution time. Once the data is large enough to fill the caches, large data messages begin to make the memory copy less efficient. This is apparent for Jupiter and Thor starting with message sizes larger than 256 bytes. Heimdall does not present this problem since the number of nodes on this cluster is too small to make the total data exceed the large cache size.

Figure 19:
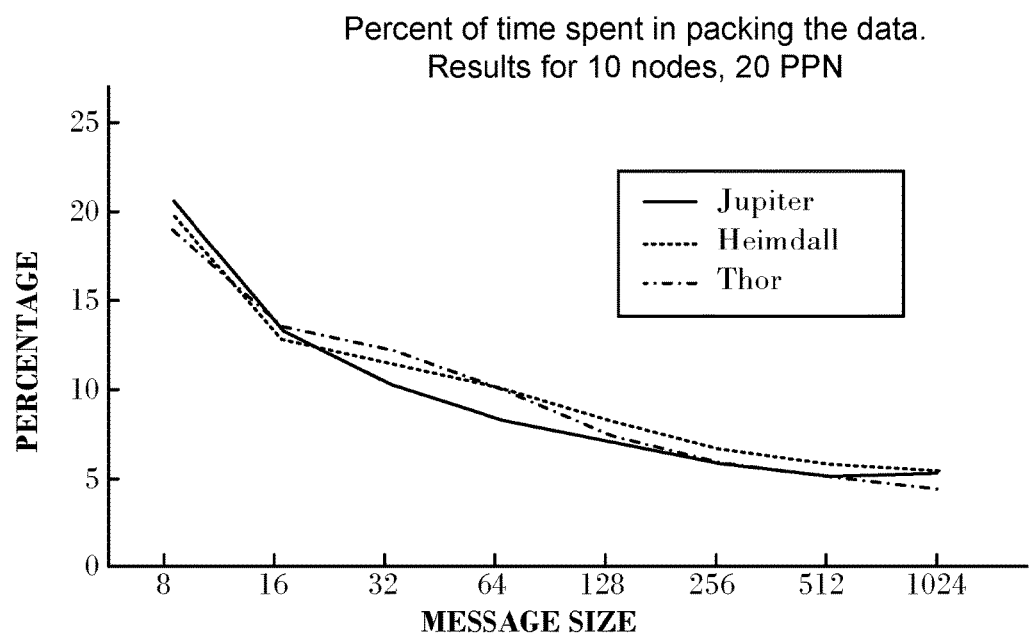
FIG. 19 presents experimental data that was produced in accordance with an embodiment of the invention.

To compare the three platforms, the same experiments were run with the same process count, 10 nodes and 20 PPN on each system. The results are presented in FIG. 19. Since the total size of the data in the all-to-all algorithm is proportional to the number of processes, runs on different systems will have the same memory footprint. In this case, the behavior of the three platforms tested is very similar: packing the data takes around 20% the execution time for 8-byte messages, and decreases monotonically to about 5% for a 1024-byte message.

Figure 20:
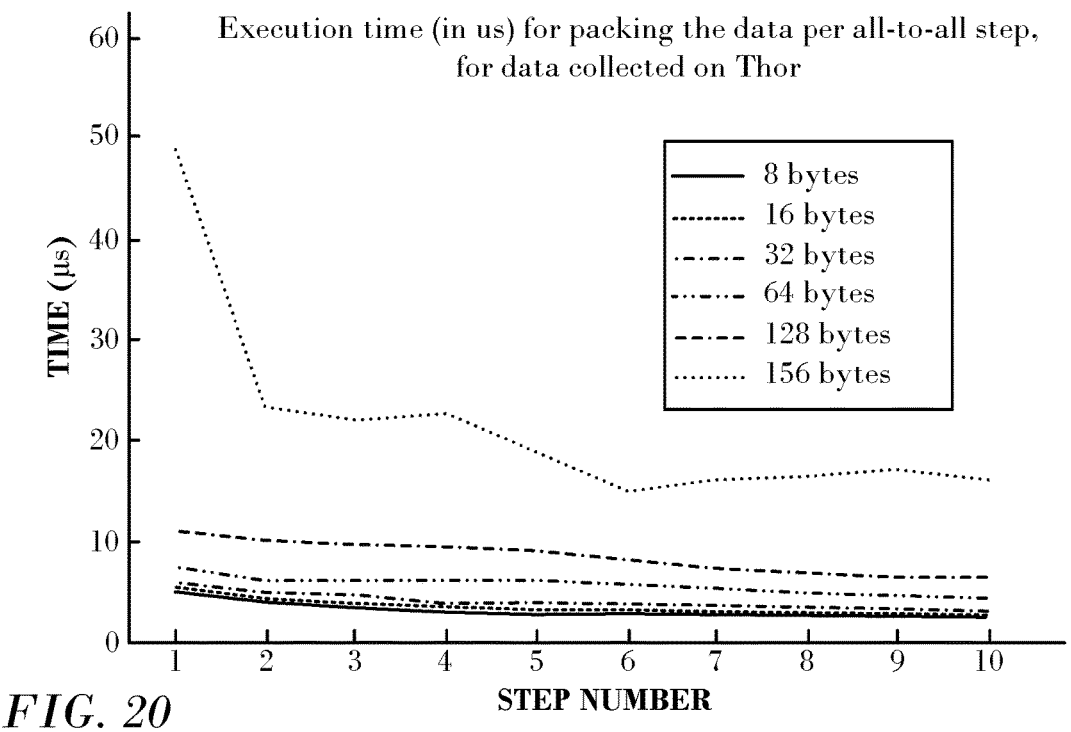
FIG. 20 presents experimental data relating to data packing that was produced in accordance with an embodiment of the invention.

To further study the algorithms, the cost of each step is measured separately. Since packing data from previous steps is overlapped with sending the data for the current step, the execution time for each step shown in FIG. 18 contains only the packing time for the current step. In the all-to-all algorithm, the continuous chunks of data that must be sent increases in size with each step. Thus, the total time spent in packing the data decreases for later steps. FIG. 20 shows the execution time of packing the data for each of the 10 steps of the all-to-all algorithm for Thor's 1024 processes (one line for each data size, from 8 to 256 bytes). As expected, there is a small decrease in the time spent for data packing for messages smaller than 256 bytes. For 256 bytes the behavior becomes irregular. Thor, as all other systems we ran on, has a 256 KB L2 cache. Packing 256 byte data when running the all-to-all algorithm on 1024 processes requires a total memory space of 128 KB at each step. Together with the next cache lines that are prefetched into the L2 cache, this data exceeds the available memory in the L2 cache.

Thus, the larger time spent in packing the data for the first several steps can be attributed to the increase in L2 cache misses when data size exceeds 256 bytes. Similar behavior can be seen for the other systems, but at different message sizes, since the smaller number of processes run on these systems decreases the total memory footprint.

Figure 21:
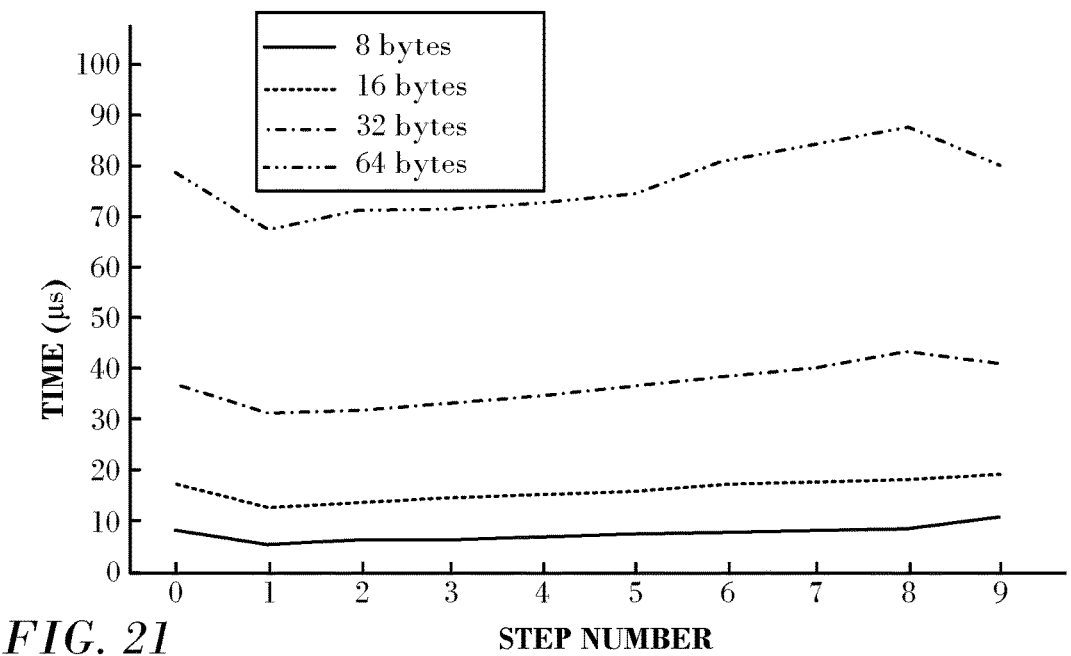
FIG. 21 presents experimental data relating to polling that was produced in accordance with an embodiment of the invention.

FIG. 21 shows the average time spent in polling for completion for each step of the algorithm. The results shown in this figure are for the same execution as for FIG. 20. The overall time for polling is constant throughout the steps, showing an overall increase compared to the time spent for packing the data. For example, for 8 bytes, the time for polling stagnates at 7.5 µs, while the time to pack the data fluctuates between 2.5 and 5 µs depending on the step. Overall the time to poll for completion is 2.38 times slower than packing the data. For 16 bytes, packing the data takes similar time as for 8 bytes (between 2.7 and 5.4 µs) while polling for completion stagnates around 16.5 µs. This figure shows how important it is to overlap as much as possible when preparing and sending the data with waiting to receive data from previous steps. For this reason the hybrid implementation takes advantage of the fact that after the threshold for switching between memory copy and hardware scatter/gather is exceeded, both hardware scatter/gather and memory copy are used. Thus, one doesn't need to wait for the data in the previous step to start sending the memory copy portion of the current step.

All the buffers received after the threshold is exceeded use hardware scatter/gather to communicate the data. Thus, only the send portion of the code applicable to hardware scatter/gather is blocked while waiting for the last piece of the data. Thus, the data for which we poll for completion before allowing the iterations to move one step further is only the data required by hardware scatter/gather. This optimization decreases the time spent in the polling function (similar to the decreases seen in FIG. 21 between different data sizes).

Hybrid Algorithm.

The performance of the hybrid algorithm was tested and analyzed for several input parameters (the crossover threshold and the message size), to better understand its benefits and limitations.

Figure 22:
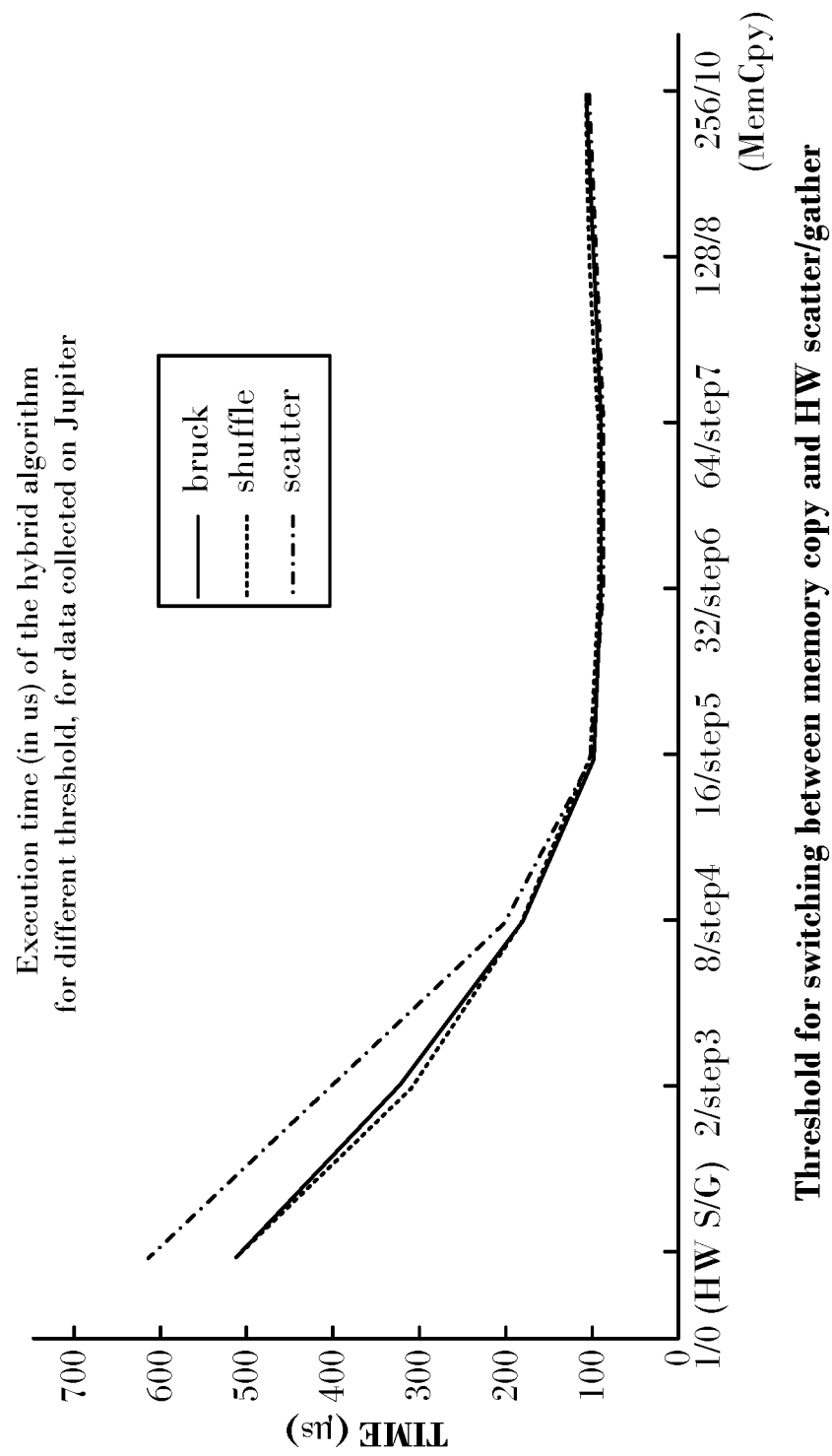
FIG. 22 presents experimental data relating to execution times for different thresholds using a hybrid algorithm that was produced in accordance with an embodiment of the invention.

FIG. 22 shows an example of execution times for different thresholds using a hybrid algorithm on Jupiter for an 8 byte all-to-all algorithm. Notice that the first value for the threshold (of 0) corresponds to using hardware scatter/gather for all steps, while the last value (equal to the number of steps) represents the case when only memory copy is used.

The hybrid algorithm was tested using the patterns described in the previous section: the classic Bruck-like pattern, the shuffle pattern, and the scatter pattern. All the experiments on all systems and with any input configuration show the same overall behavior. Since we focused on small messages, using hardware scatter/gather for all steps gives higher execution times that just memory copy. In particular, when the threshold is set to 0, the scatter pattern gives the worst results, followed by either shuffle or the classic Bruck algorithm. This means that scattering on the receive side is more costly than gathering on the send side when the data that needs to be collected is small and in multiple buffers.

This might be explained by the fact that for the beginning steps the gather is done from a few buffers while the scatter on the receive side needs to be done to all buffers for the entire all-to-all algorithm. As the algorithm progresses, the number of buffers that need to be accessed for the gather increases, while for the scatter it decreases. However, the size of the continuous chunks of data that need to be transferred also become larger. This is why the scatter pattern offers the best speed-ups when the threshold allows the hardware scatter/gather to be used efficiently.

The Bruck and shuffle patterns have similar performance with the shuffle being slightly better than the Bruck pattern most of the time. Details are shown in the next subsection, which analyzes the speed-ups obtained with these patterns.

All-to-All Speed-Up.

Figure 23:
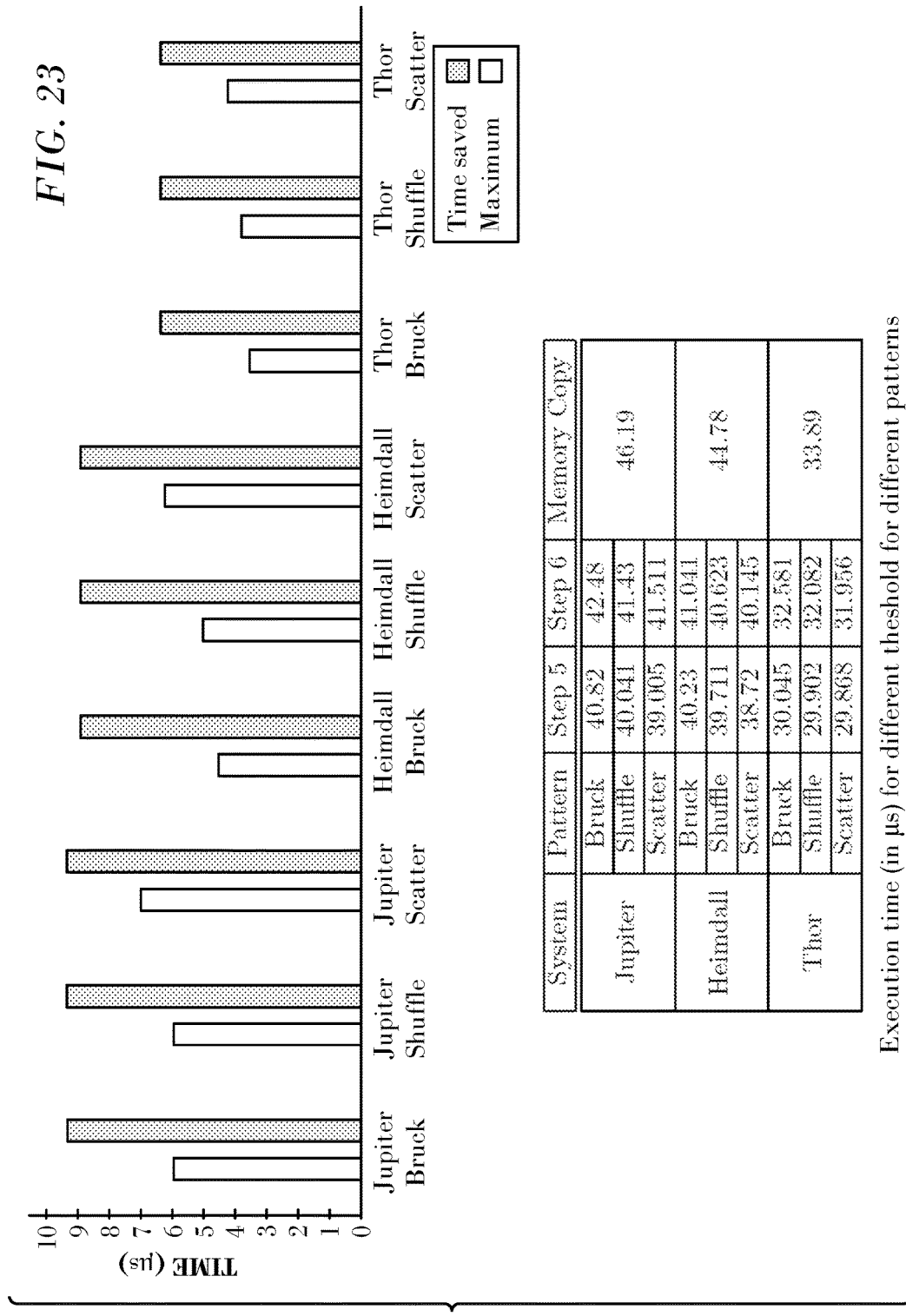
FIG. 23 presents experimental data relating to execution times at different threshold values using a hybrid algorithm on different platforms that was produced in accordance with an embodiment of the invention.

While the overall behavior is the same for all our experiments, different threshold values offer the best results for each of the three platforms. FIG. 23 shows the speed-ups for all three platforms when running 200 processes on ten nodes with a data size of eight bytes. The table in the lower part of the figure presents the total execution times. The all-to-all algorithm has a total of eight steps for this experiment. All three patterns presented are hardware accelerated by the hybrid algorithm. The hybrid code outperforms the memory copy one when applying hardware scatter/gather for chunks greater than or equal to 16 elements of eight bytes. The blue bars in the figure show the speed-up when using a threshold of 16 elements, corresponding to using the hardware scatter/ gather capability starting from the sixth step, and the orange bars when using 32 elements.

The Scatter algorithm has the best speed-up for all three platforms. All platforms have similar best results, more than 15% for Jupiter, almost 14% for Heimdall and 12% for Thor. Note however, that packing the data with memory copy takes slightly different percentages out of the total execution time. When considering the gain of using hardware scatter/gather compared to the upper limit, Jupiter has the best speed-up (around 74%). Heimdall and Thor have similar results decreasing the total time for packing the data with memory copy by 65%. These speed-ups were achieved even though the first five steps of the algorithm use only memory copies. This was possible by overlapping the sending/receiving time for previous steps while preparing the data for the next steps for the memory copy portion of the code.

The receive completion function for the steps where hardware scatter/gather is being used has also seen a decrease in the total waiting time since now we are only blocking for a smaller data size. Thus, the hybrid algorithm optimizes not just the portion of the code responsible for the memory copy, but also the receiving time. This time is different for each of the platforms depending on the network used. For example, the execution time for the all-to-all algorithm on Jupiter is 46 µs and the total time for packing the data with memory copy is 9.4 µs (the packing time for the last 4 steps representing a little over 3.9 µs). The hybrid algorithm with a threshold of 16 bytes shows a total execution time of 40.82 µs for the first pattern, corresponding to a decrease in the execution time equal to 5.2 µs. Out of this 5.2 µs only 3.2 µs are due to replacing the memory copy time by hardware scatter/gather. The rest is obtained by overlapping all the sends of the memory copy buffers for latter steps with polling for completion for the hardware scatter/gather buffers. We argue that Jupiter and Heimdall had a higher potential for optimization due to their use of a less capable network, which allowed the hybrid algorithm to achieve higher speed-ups.

Figure 24:
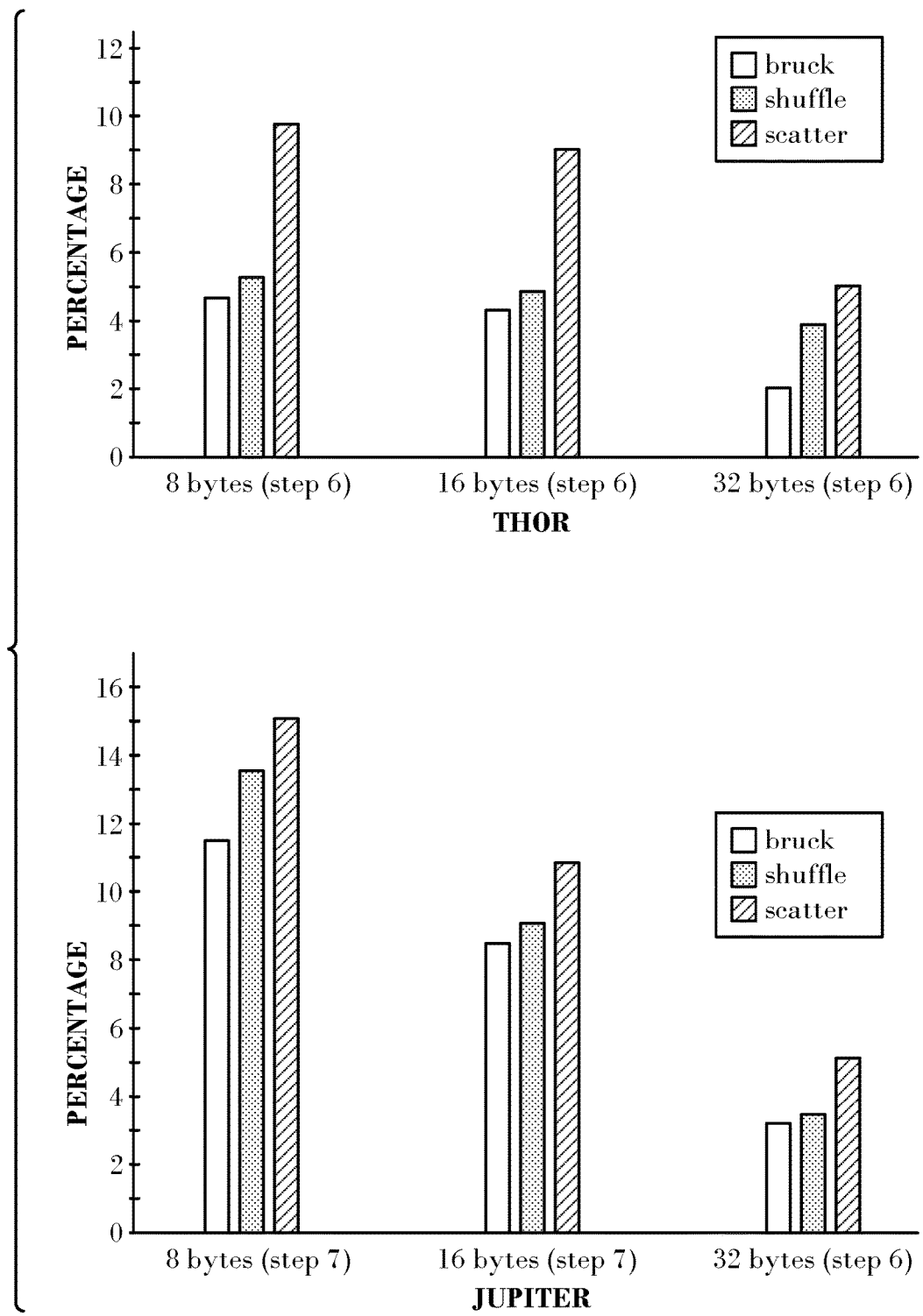
FIG. 24 presents experimental data relating to message size that was produced in accordance with an embodiment of the invention.

The effect of message size on the speed-up was tested. For this, the hybrid algorithm was run on Thor and Jupiter with 1024 and 640 processes, respectively, with message sizes of 8, 16 and 32 bytes. FIG. 24 presents these results. For each case we chose the threshold that gave the best results. As the data size increases, the data packing step takes a smaller amount of the total execution time, so it is expected to see a decrease in the total speed-up of the hybrid algorithm. For Thor this means a decrease from 10% to 5% when increasing the data size from 8 to 32 bytes, while for Jupiter it means a decrease from 14% to 5%.

The best results for the hybrid algorithm when running on Thor were obtained when using a threshold of 16 elements (step six), while for Jupiter it varies between 32 and 16 elements (steps six and seven). As the data increases in size, so do the consecutive chunks of bytes that need to be packed. This makes the memory copy algorithm more efficient and thus less time is spent packing the data compared to the total execution time. This is why, for the same system running with the same number of processes, the amount of speedup obtained will decrease with the increase of the data size. We expect this pattern to be visible until the data size becomes large enough to exceed the cache size. As seen in FIG. 20, when the data exceeds the L2 cache size or when the chunks of bytes between consecutive elements exceeds the cache line, the memory copy code sees a large decrease in performance.

For the examples under study, for the same number of processes, as we increase the data size, the hybrid algorithm needs fewer steps before it can beneficially use the hardware scatter/gather capabilities. This is visible both on Jupiter in FIG. 24, and for Heimdall and Thor when using 10 nodes with 20 processes (not shown). Moreover, when the number of processes increases we expect to see the same behavior since the number of processes directly influences the amount of data that must be packed and sent.

The speed-up seen in FIG. 24 accounts for optimizations in both the packing step of the algorithm as well as for decreasing the receive wait function time. For Jupiter, the 8 byte all-to-all algorithm runs for 104 µs out of which 22.2 µs are spent handling the data. The average receive wait time per step is 5 µs while packing the data for the last 4 steps takes 6.4 µs. The hybrid algorithm gives a maximum decrease in the total execution time of 12, 14 and 16.5 µs when using the Bruck, the shuffle and the scatter patterns respectively.

However, only 6 µs are improved because of replacing the memory copy portion. For Thor, the 8 byte all-to-all algorithm takes 135 µs out of which 32 µs are spent for memory copy. The last 3 steps take 7.7 µs (the last 4 steps take 10.4 µs) and the algorithm polls for receive completion an average of 7.8 µs per step. The hybrid algorithm gives a maximum decrease in the total execution time of 6.4 µs, 7.1 µs (when using hardware scatter/gather from the 7th step) and 13.1 µs (when using hardware scatter/gather on the 6th step) for each of the three patterns. The optimization for decreasing the polling time shows a smaller decrease in the total execution time. Systems with more capable networks will see a smaller optimization from improving the polling time. However, such systems will have a larger bottleneck at the memory copy step, thus increasing the benefit of replacing this portion with the hardware scatter/gather capability.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A method of data communication, comprising the steps of:
   in a plurality of entities that are networked via a fabric, the entities respectively comprising a host and a network interface device linked to the host and to the fabric:
   executing a process group in the hosts of the entities; and
   transmitting messages from all members of the process group to all members of the process group by:
   in each of the entities iterating the steps of:
   accessing first data that originates from members of the process group that are executing therein by the steps of:
      (a) packing a portion of the first data into a contiguous buffer; and
      (b) gathering a remaining portion of the first data using a scatter/gather hardware facility of the network interface device, wherein the portion of the first data comprises messages that do not exceed a predefined size, and the remaining portion of the first data comprises messages that exceed the predefined size;
   in the network interface device receiving instances of second data in respective receive buffers from other entities;
   interleaving the first data with previously received instances of second data;
   providing a communicator having a size N; and assigning a destination rank to each member of the process group, wherein interleaving further comprises shuffling the first data and the instances of second data according to a formula $$p_r = \Sigma_{i=0}^{s-1} k^s j_i,$$

where r is a tuple having a size ceil($\log_k(N)$), j is an index to data, $j_i$ is a value of an $i^{th}$ element of the tuple in a current iteration, $p_r$ is the destination rank of the member of the process group, s is an iteration index, and k is a radix; and transmitting the interleaved data from the network interface device via the fabric to another entity.

2. The method according to claim 1, wherein accessing first data comprises assigning respective destination ranks to the members of the process group, according to the entities in which the members are executing, and wherein interleaving comprises arranging the first data and instances of second data received in previous iterations in data blocks, the data blocks originating from different source entities and being destined for members of the process group having common destination ranks.

3. The method according to claim 1, further comprising:
in each of the entities providing a respective send buffer for use in each iteration of transmitting the interleaved data; and
in each iteration of interleaving with the scatter/gather hardware facility distributing portions of the second data that are required for the current iteration and subsequent iterations of transmitting the interleaved data into the respective send buffer thereof.

4. The method according to claim 3, further comprising:
in each iteration of interleaving increasing a separation of blocks of first data by blocks of second data.

5. The method according to claim 1, wherein transmitting messages comprises referencing the messages using respective memory keys.

6. The method according to claim 1, wherein transmitting messages is performed by concurrently transmitting the messages in an input buffer while populating new input buffers with new messages.

7. A system of data communication, comprising:
a plurality of entities that are networked via a fabric, the entities respectively comprising:
a host;
a network interface device linked to the host and to the fabric; and
a scatter/gather hardware facility in the network interface device, the entities cooperative for performing the steps of:
executing a process group in the host of respective entities;
transmitting messages from all members of the process group to all members of the process group by:
in each of the entities iterating the steps of:
accessing first data that originates from members of the process group that are executing therein by the steps of:
(a) packing a portion of the first data into a contiguous buffer; and
(b) gathering a remaining portion of the first data using the scatter/gather hardware facility, wherein the portion of the first data comprises messages that do not exceed a predefined size, and the remaining portion of the first data comprises messages that exceed the predefined size;

in the network interface device receiving instances of second data in respective receive buffers from other entities;
interleaving the first data with previously received instances of second data;
providing a communicator having a size N; and
assigning a destination rank to each member of the process group, wherein interleaving further comprises shuffling the first data and the instances of second data according to a formula $$p_r = \Sigma_{i=0}^{s-1} k^s j_i,$$

where r is a tuple having a size ceil($\log_k(N)$), j is an index to data, $j_i$ is a value of an $i^{th}$ element of the tuple in a current iteration, $p_r$ is the destination rank of the member of the process group, s is an iteration index, and k is a radix; and transmitting the interleaved data via the fabric to another entity.

8. The system according to claim 7, wherein transmitting messages comprises assigning respective destination ranks to the members of the process group, according to the entities in which the members are executing, and wherein interleaving comprises arranging the first data and instances of second data received in previous iterations in data blocks, the data blocks originating from different source entities and being destined for members of the process group having common destination ranks.

9. The system according to claim 7, further comprising:
in each of the entities providing a respective send buffer for use in each iteration of transmitting the interleaved data; and
in each iteration of interleaving with the scatter/gather hardware facility distributing portions of the second data that are required for the current iteration and subsequent iterations of transmitting the interleaved data into the respective send buffer thereof.

10. The system according to claim 9, further comprising:
in each iteration of interleaving increasing a separation of blocks of first data by blocks of second data.

11. The system according to claim 7, wherein transmitting messages comprises referencing the messages using respective memory keys.

12. The system according to claim 7, wherein transmitting messages is performed by concurrently transmitting the messages in an input buffer while populating new input buffers with new messages.

13. A method of data communication, comprising the steps of:
in a plurality of entities that are networked via a fabric, the entities respectively comprising a host and a network interface device linked to the host and to the fabric:
executing a process group in the hosts of the entities; and
transmitting messages from all members of the process group to all members of the process group by:
in each of the entities iterating the steps of:
accessing first data that originates from members of the process group that are executing in the host of respective entities by the steps of:
(a) packing a portion of the first data into a contiguous buffer; and
(b) gathering a remaining portion of the first data using a scatter/gather hardware facility of the network interface device, wherein the portion of the first data comprises messages that do not exceed a predefined size, and the remaining portion of the first data comprises messages that exceed the predefined size;

in the network interface device receiving instances of second data in respective receive buffers from other entities;

interleaving the first data with previously received instances of second data;

transmitting the interleaved data from the network interface device via the fabric to another entity;

in each of the entities providing a respective send buffer for use in each iteration of transmitting the interleaved data; and in each iteration of interleaving with the scatter/gather hardware facility distributing portions of the second data that are required for a current iteration and subsequent iterations of transmitting the interleaved data into the respective send buffer thereof.

14. The method according to claim 13, further comprising: in each iteration of interleaving increasing a separation of blocks of the first data by blocks of the second data.

15. A system of data communication, comprising:
a plurality of entities that are networked via a fabric, the entities respectively comprising:
a host;
a network interface device linked to the host and to the fabric; and
a scatter/gather hardware facility in the network interface device, the entities cooperative for performing the steps of:
executing a process group in the host of respective entities;
transmitting messages from all members of the process group to all members of the process group by:
in each of the entities iterating the steps of:
accessing first data that originates from members of the process group that are executing in the host of respective entities by the steps of:
  (a) packing a portion of the first data into a contiguous buffer; and
  (b) gathering a remaining portion of the first data using the scatter/gather hardware facility, wherein the portion of the first data comprises messages that do not exceed a predefined size, and the remaining portion of the first data comprises messages that exceed the predefined size;
in the network interface device receiving instances of second data in respective receive buffers from other entities;
interleaving the first data with previously received instances of second data;
transmitting the interleaved data from the network interface device via the fabric to another entity;
in each of the entities providing a respective send buffer for use in each iteration of transmitting the interleaved data; and
in each iteration of interleaving with the scatter/gather hardware facility distributing portions of the second data that are required for a current iteration and subsequent iterations of transmitting the interleaved data into the respective send buffer thereof.

16. The system according to claim 15, further comprising: in each iteration of interleaving increasing a separation of blocks of the first data by blocks of the second data.

* * * * *